(12) United States Patent
Kamiya et al.

(10) Patent No.: US 10,352,451 B2
(45) Date of Patent: Jul. 16, 2019

(54) SEALING STRUCTURE WITH TORSIONAL DAMPER AND OIL SEAL

(71) Applicant: NOK CORPORATION, Tokyo (JP)

(72) Inventors: Yusuke Kamiya, Fukushima (JP); Hiroki Matsui, Fukushima (JP); Shinya Omoto, Tottori (JP); Toru Nakashima, Tottori (JP); Hirotaka Mizuta, Fujisawa (JP)

(73) Assignee: NOK CORPORATION, Tokyo (JP)

( * ) Notice: Subject to any disclaimer, the term of this patent is extended or adjusted under 35 U.S.C. 154(b) by 164 days.

(21) Appl. No.: 15/608,074

(22) Filed: May 30, 2017

(65) Prior Publication Data

US 2017/0268676 A1   Sep. 21, 2017

Related U.S. Application Data

(63) Continuation of application No. PCT/JP2015/084124, filed on Dec. 4, 2015.

(30) Foreign Application Priority Data

Dec. 4, 2014  (JP) ................................. 2014-246245
Feb. 13, 2015  (JP) ................................. 2015-025925

(51) Int. Cl.
  *F16H 55/36* (2006.01)
  *F16J 15/44* (2006.01)
  (Continued)

(52) U.S. Cl.
  CPC ......... *F16J 15/3208* (2013.01); *F16F 15/126* (2013.01); *F16F 15/1245* (2013.01);
  (Continued)

(58) Field of Classification Search
  CPC .......................... F16C 2326/02; F16C 33/805; F16C 33/7886; F16J 15/3264; F16J 15/3232
  (Continued)

(56) References Cited

U.S. PATENT DOCUMENTS 3,341,265 A * 9/1967 Paterson ................. B61F 15/22
                                                    277/356
3,391,940 A * 7/1968 Baugh .................. F16J 15/3264
                                                    277/565

(Continued)

FOREIGN PATENT DOCUMENTS

CN        2752528 Y      1/2006
CN      101189460 A      5/2008
(Continued)

OTHER PUBLICATIONS

Korean Office Action dated Mar. 26, 2018 in a corresponding Korean Application No. 10-2017-7018436 and English translation.

(Continued)

*Primary Examiner* — Henry Y Liu
(74) *Attorney, Agent, or Firm* — Peame & Gordon LLP

(57) ABSTRACT

A sealing structure with a torsional damper and an oil seal includes a damper pulley serving as a torsional damper and an oil seal. The damper pulley has an annular hub pocket that is recessed in the outer side direction and extends in the circumferential direction along a boss part of a hub. The oil seal includes a side lip that extends toward the outer side. An outer circumferential surface of the hub pocket increases in a diameter toward the outer side, the side lip of the oil seal does not enter inside the hub pocket, and an annular gap is formed between an outer side end of the side lip and an inner side end of the outer circumferential surface of the hub pocket.

9 Claims, 22 Drawing Sheets

(51) Int. Cl.
  *F16F 15/124* (2006.01)
  *F16F 15/126* (2006.01)
  *F16J 15/447* (2006.01)
  *F16J 15/3204* (2016.01)
  *F16J 15/3208* (2016.01)

(52) U.S. Cl.
  CPC .......... *F16H 55/36* (2013.01); *F16J 15/3204* (2013.01); *F16J 15/44* (2013.01); *F16J 15/447* (2013.01); *F16F 2230/0052* (2013.01); *F16F 2230/30* (2013.01); *F16H 2055/366* (2013.01)

(58) Field of Classification Search
  USPC .......................................................... 474/94
  See application file for complete search history.

(56) References Cited

U.S. PATENT DOCUMENTS

| | | | | |
|---|---|---|---|---|
| 4,856,794 A * | 8/1989 | Boyers | F16J 15/3268 | 277/571 |
| 5,201,529 A * | 4/1993 | Heinzen | F16J 15/3256 | 277/351 |
| 6,513,812 B1 * | 2/2003 | Yang | F16J 15/3256 | 277/351 |
| 6,684,735 B2 * | 2/2004 | Watanabe | F16F 15/1203 | 428/450 |
| 7,055,828 B2 * | 6/2006 | Hatch | F16J 15/3228 | 277/351 |
| 7,066,467 B2 * | 6/2006 | Sakata | F16C 19/49 | 277/351 |
| 7,674,044 B2 * | 3/2010 | Matsui | F16C 33/7876 | 384/480 |
| 8,474,825 B2 * | 7/2013 | Nakagawa | F16J 15/164 | 277/353 |
| 8,864,139 B2 * | 10/2014 | Greca | F16J 15/3256 | 277/409 |
| 8,905,641 B2 * | 12/2014 | Duch | B60B 27/0073 | 384/480 |
| 10,041,562 B2 * | 8/2018 | Kamiya | F16F 15/126 | |
| 10,240,674 B2 * | 3/2019 | Sakai | F16J 15/002 | |
| 2002/0129675 A1 * | 9/2002 | Watanabe | F16F 15/1203 | 74/574.4 |
| 2005/0110221 A1 * | 5/2005 | Oates | F16J 15/3264 | 277/549 |
| 2006/0188191 A1 * | 8/2006 | Schenk | F16C 13/006 | 384/489 |
| 2007/0076994 A1 * | 4/2007 | Norimatsu | B60B 27/00 | 384/486 |
| 2007/0147718 A1 * | 6/2007 | Takimoto | F16C 33/7886 | 384/486 |
| 2007/0270227 A1 * | 11/2007 | Okinaga | F16F 15/126 | 464/68.4 |
| 2007/0278748 A1 * | 12/2007 | Matsui | F16C 33/7896 | 277/549 |
| 2008/0031556 A1 * | 2/2008 | Heim | B60B 27/00 | 384/448 |
| 2008/0292231 A1 * | 11/2008 | Matsui | F16C 33/7876 | 384/486 |
| 2008/0317595 A1 * | 12/2008 | Hoji | F04D 13/021 | 415/230 |
| 2009/0127797 A1 * | 5/2009 | Kanzaki | F16J 15/3264 | 277/565 |
| 2009/0257698 A1 * | 10/2009 | Aritake | F16C 19/386 | 384/484 |
| 2009/0263063 A1 * | 10/2009 | Komori | F16C 35/067 | 384/478 |
| 2010/0247014 A1 * | 9/2010 | Ohmori | F16C 19/186 | 384/486 |
| 2011/0221140 A1 * | 9/2011 | Nakagawa | F16J 15/164 | 277/412 |
| 2012/0007316 A1 * | 1/2012 | Terasawa | F16C 33/7876 | 277/361 |
| 2013/0094976 A1 * | 4/2013 | Murakami | F04D 13/02 | 417/313 |
| 2014/0003753 A1 * | 1/2014 | Haepp | F16C 33/7886 | 384/480 |
| 2014/0339775 A1 * | 11/2014 | Yarimizu | F02F 7/00 | 277/353 |
| 2017/0138458 A1 * | 5/2017 | Lee | F16H 55/36 | |
| 2017/0234398 A1 * | 8/2017 | Kamiya | F16F 15/126 | 277/562 |

FOREIGN PATENT DOCUMENTS

| | | |
|---|---|---|
| CN | 202790543 U | 3/2013 |
| EP | 2685118 A1 | 1/2014 |
| JP | H03-20175 A | 1/1991 |
| JP | H05-25049 U | 4/1993 |
| JP | H09-324861 A | 12/1997 |
| JP | 63-196867 U1 | 12/1998 |
| JP | 2007-232165 A | 9/2007 |
| JP | 2011-220389 A | 11/2011 |
| JP | 2011-241891 A | 12/2011 |
| JP | 2012-177469 A | 9/2012 |
| JP | 5556355 B2 | 7/2014 |
| KR | 2002-0073269 A | 9/2002 |
| RU | 2345258 C2 | 1/2009 |
| WO | 2006/022280 A1 | 3/2006 |
| WO | 2012/107118 A1 | 8/2012 |

OTHER PUBLICATIONS

Chinese Office Action dated Mar. 26, 2018 in a corresponding Chinese Application No. 201580066287.0 and English translation.
Decision to Grant dated May 3, 2018 in a corresponding Russian Application No. 2017123333 and English translation.
English translation of Written Opinion from Corresponding Application No. PCT/JP2015/084124; dated Mar. 8, 2016.
English translation of the International Preliminary Report on Patentability from Corresponding Application No. PCT/JP2015/084124; dated Jun. 6, 2017.
Notification for Granting an Invention Patent dated Jun. 13, 2018 in a corresponding Chinese Application No. 201580068287.0.
Extended European Search Report dated Jun. 14, 2018 in a corresponding European Application No. 15864815.4.
Notice of Allowance dated Aug. 6, 2018 for corresponding Korean Application No. 10-2017-7018436 and English translation.
International Search Report and Written Opinion from Corresponding Application No. PCT/JP2015/084124; dated Mar. 8, 2016.
Decision to Grant a Patent from Corresponding Application No. JP2016-532160; dated Jul. 4, 2017.
Chinese Office Action dated Nov. 3, 2017 for corresponding Chinese Application No. 201580066287.0 and English translation.

* cited by examiner

SEALING STRUCTURE WITH TORSIONAL DAMPER AND OIL SEAL

The present application is a continuation application of International Application No. PCT/JP2015/084124, filed on Dec. 4, 2015, which claims priority to Japanese Patent Application No. 2014-246245, filed on Dec. 4, 2014, and Japanese Patent Application No. 2015-025925, filed on Feb. 13, 2015. The contents of these applications are incorporated herein by reference in their entirety.

BACKGROUND

Technical Field

The present disclosure relates to a sealing structure with a torsional damper and an oil seal, and particularly relates to a sealing structure comprising a torsional damper to absorb a torsional vibration generated from a rotary shaft of an engine of a vehicle or the like, and an oil seal for the torsional damper.

Background Art

In an engine of a vehicle, for example, a torsional damper is attached to one end of a crankshaft to reduce a torsional vibration caused by a rotational fluctuation of the crankshaft. The torsional damper used in the engine of the vehicle is typically in the form of a damper pulley and transmits part of the power of the engine to auxiliary machinery, such as a water pump, a compressor of an air conditioner or the like, through a power transmission belt. The gap between the torsional damper and, for example, a through-hole of a front cover into which the crankshaft is inserted is sealed by an oil seal.

FIG. 22 is a partial cross-sectional view taken along an axis, schematically showing a conventional arrangement of a damper pulley and an oil seal of an engine of a vehicle. As shown in FIG. 22, a conventional damper pulley 100 includes a hub 101, a pulley 102, and a damper elastic body 103 disposed between the hub 101 and the pulley 102. The hub 101 includes a boss part 101a on the inner periphery side, a rim part 101b on the outer periphery side, and a disk part 101c connecting the boss part 101a and the rim part 101b to each other. The damper pulley 100 is fixed to a crankshaft 120 by a bolt 121 with the boss part 101a of the hub 101 fitted into one end part of the crankshaft 120.

The boss part 101a of the hub 101 of the damper pulley 100 attached to the crankshaft 120 is inserted into a through-hole 123 of a front cover 122 from outside of the engine, an oil seal 110 is press-fitted into the gap between the boss part 101a and the through-hole 123, and a seal lip 111 slidably abuts in a fluid-tight manner against the boss part 101a to form a seal between the damper pulley 100 and the front cover 122.

With such a conventional arrangement of the damper pulley 100 and the oil seal 110, foreign matter can enter between the oil seal 110 and the boss part 101a, and if the seal lip 111 catches the foreign matter, the seal lip 111 may be damaged or deteriorated, and the sealing performance of the oil seal 110 may deteriorate, leading to oil leakage. To avoid this, there is disclosed a structure that reduces entry of foreign matter between the oil seal 110 and the boss part 101a through the gap between the damper pulley 100 and the front cover 122 (for example, see Japanese Patent Application Publication No. 09-324861).

In addition, to reduce the weight and manufacturing cost, some conventional damper pulleys 100 have a plurality of windows 101d as through holes passing through the disk part 101c of the hub 101, circumferentially formed (for example, see Japanese Utility Model Application Publication No. 05-25049 and Japanese Patent No. 5556355).

However, the conventional damper pulley 100 with the windows 101d is susceptible to entry of foreign matter such as muddy water, sand or dust to the side of the engine through the windows 101d, although the damper pulley 100 has a reduced weight and is manufactured at reduced cost in the engine. Thus, such a torsional damper with windows requires further improvement in the capability of reducing entry of foreign matter to the seal part.

As described above, when the conventional damper pulley 100 with the windows 101d is used, there is a demand for further reducing exposure of the seal lip 111 of the oil seal 110 not only to foreign matter entering from around the outer periphery of the damper pulley 100 but also to foreign matter entering through the windows 101d. Furthermore, with the increasing diversity of the use environment of vehicles in recent years, there is a demand for further reducing exposure of the seal lip 111 of the oil seal 110 to foreign matter entering from the outside.

The present disclosure is related to provide a sealing structure with a torsional damper and an oil seal that can reduce exposure of a seal lip of the oil seal to foreign matter entering from around the torsional damper.

SUMMARY

A sealing structure with a torsional damper and an oil seal according to the present disclosure is a sealing structure with a torsional damper and an oil seal, wherein the torsional damper includes a hub, an annular mass body centered about an axis that covers an outer circumference of the hub, and a damper elastic body that is disposed between the hub and the mass body and elastically connects the hub and the mass body to each other, the torsional damper being attached to one end of a rotary shaft with the hub being inserted in a through-hole of an attachment target part, the oil seal includes an annular seal lip centered about the axis and an annular side lip centered about the axis and is attached in the through-hole of the attachment target part to seal between the hub and the through-hole of the attachment target part, the hub includes an annular boss part centered about the axis, an annular rim part centered about the axis that is located at an outer periphery of the boss part, a disk-shaped disk part centered about the axis that connects the boss part and the rim part to each other, and an annular hub pocket centered about the axis, the hub pocket includes an annular outer circumferential surface opposed to the boss part on an outer periphery side and provides an annular recess centered about the axis that is recessed in a direction toward the disk part, the outer circumferential surface of the hub pocket increases in diameter toward the disk part along the axis, and the seal lip of the oil seal directly or indirectly abuts against the boss part in a slidable manner, and the side lip of the oil seal extends toward the hub pocket so that an annular gap is formed between the side lip and the outer circumferential surface of the hub pocket.

In the sealing structure with a torsional damper and an oil seal according to an aspect of the present disclosure, the side lip forms the annular gap with an end portion of the outer circumferential surface of the hub pocket on the side of the oil seal.

In the sealing structure with a torsional damper and an oil seal according to an aspect of the present disclosure, the side lip is opposed to the outer circumferential surface of the hub pocket, and the annular gap is formed between the side lip and the outer circumferential surface of the hub pocket.

In the sealing structure with a torsional damper and an oil seal according to an aspect of the present disclosure, a diameter-increasing angle, which is an angle of the diameter-increasing outer circumferential surface of the hub pocket with respect to the axis, is equal to or greater than 4° and equal to or smaller than 18°.

In the sealing structure with a torsional damper and an oil seal according to an aspect of the present disclosure, a gap angle difference, which is the difference between a diameter-increasing angle, which is an angle of the diameter-increasing outer circumferential surface of the hub pocket with respect to the axis, and an inclination angle, which is an angle of the side lip with respect to the axis, is equal to or greater than 1.0° and equal to or smaller than 11.0°.

In the sealing structure with a torsional damper and an oil seal according to an aspect of the present disclosure, the hub has an annular attachment annular member that is removably attached to the boss part of the hub, and the outer circumferential surface of the hub pocket is formed in the attachment annular member.

In the sealing structure with a torsional damper and an oil seal according to an aspect of the present disclosure, the disk part of the hub of the torsional damper has at least one window that penetrates the disk part.

To attain the object described above, a sealing structure with a torsional damper and an oil seal according to the present disclosure is a sealing structure with a torsional damper and an oil seal, further comprising: a hollow annular member centered about an axis, wherein the torsional damper includes a hub, an annular mass body centered about the axis that covers an outer circumference of the hub, and a damper elastic body that is disposed between the hub and the mass body and elastically connects the hub and the mass body to each other, the torsional damper being attached to one end of a rotary shaft with the hub being inserted in a through-hole of an attachment target part, the annular member is formed to be capable of being fitted into the through-hole of the attachment target part and has an annular protrusion centered about the axis, the oil seal includes an annular seal lip centered about the axis and is attached in the through-hole of the attachment target part via the annular member to seal between the hub and the through-hole of the attachment target part, the hub includes an annular boss part centered about the axis, an annular rim part centered about the axis that is located at an outer periphery of the boss part, a disk-shaped disk part centered about the axis that connects the boss part and the rim part to each other, and an annular hub pocket centered about the axis, the hub pocket includes an annular outer circumferential surface opposed to the boss part on an outer periphery side and provides an annular recess centered about the axis that is recessed in a direction toward the disk part, the outer circumferential surface of the hub pocket increases in a diameter toward the disk part along the axis, the seal lip of the oil seal directly or indirectly abuts against the boss part in a slidable manner, and the protrusion of the annular member extends toward the hub pocket so that an annular gap is formed between the protrusion and the outer circumferential surface of the hub pocket.

In the sealing structure with a torsional damper and an oil seal according to an aspect of the present disclosure, the disk part of the hub of the torsional damper has at least one window that penetrates the disk part.

The sealing structures with a torsional damper and an oil seal according to the present disclosure can reduce exposure of a seal lip of the oil seal to foreign matter entering from around the torsional damper.

BRIEF DESCRIPTION OF DRAWINGS

FIG. 5A is a partial cross-sectional perspective view.

DETAILED DESCRIPTION

Hereinafter, embodiments of the present disclosure will be described with reference to the drawings.

Figure 1:
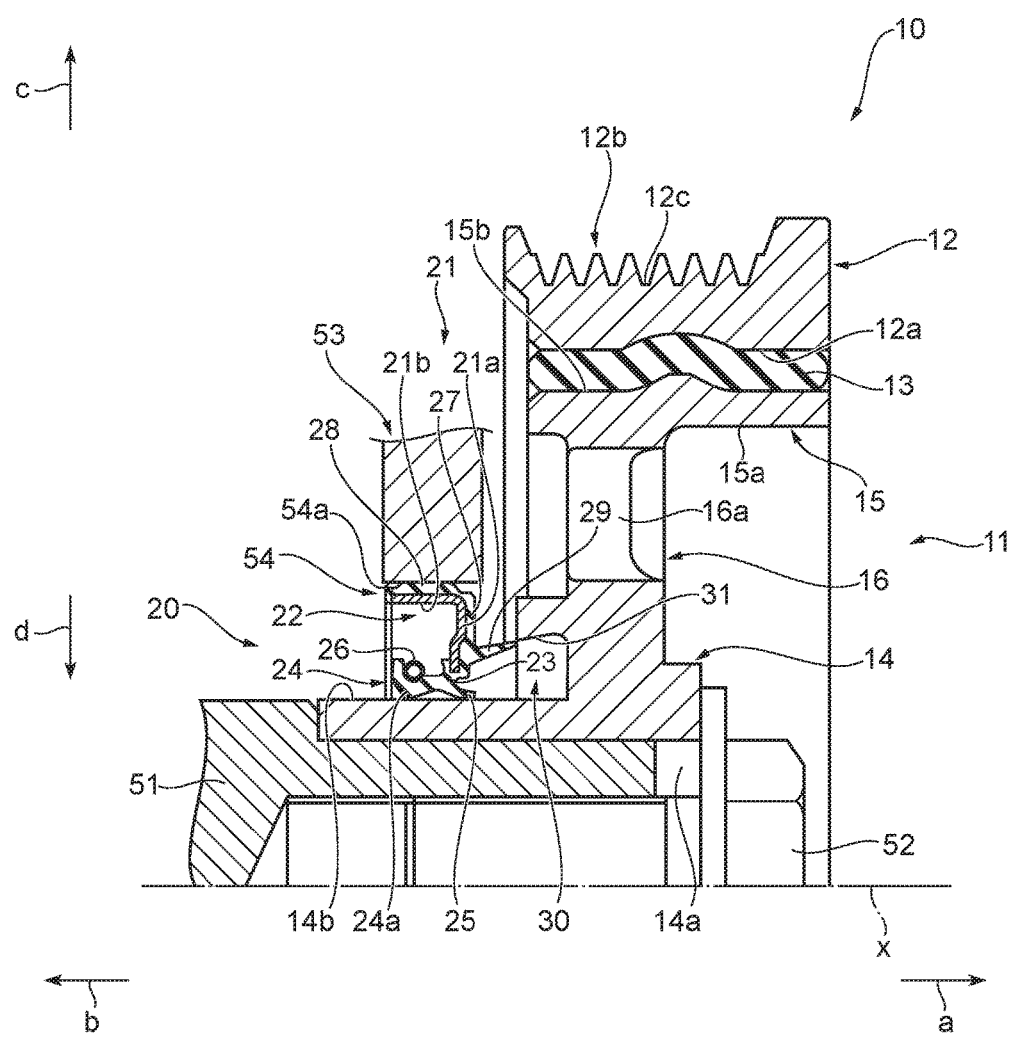
FIG. 1 is a partial cross-sectional view taken along an axis, showing a schematic configuration of a sealing structure with a torsional damper and an oil seal according to a first embodiment of the present disclosure.

FIG. 1 is a partial cross-sectional view taken along an axis, showing a schematic configuration of a sealing structure with a torsional damper and an oil seal according to a first embodiment of the present disclosure. The sealing structure with a torsional damper and an oil seal according to the first embodiment of the present disclosure is used for an engine of an automobile. In the following, for convenience of explanation, an arrow a (see FIG. 1) direction in a direction of an axis x will be referred to as an outer side, and an arrow b (see FIG. 1) direction in the direction of the axis x will be referred to as an inner side. More specifically, the outer side is the direction away from the engine, and the inner side is the direction toward the engine and is the engine side. In a direction perpendicular to the axis x (which will be also referred to as "a radial direction"), the direction away from the axis x (indicated by an arrow c in FIG. 1) will be referred to as an outer periphery side, and the direction toward the axis x (indicated by an arrow "d" in FIG. 1) will be referred to as an inner periphery side.

As shown in FIG. 1, a sealing structure 1 with a torsional damper and an oil seal according to the first embodiment of the present disclosure includes a damper pulley 10 as the torsional damper and an oil seal 20. The damper pulley 10 is fixed to one end of a crankshaft 51 of the engine by a bolt 52, and the oil seal 20 forms a seal between a through-hole 54 of a front cover 53 of the engine and the damper pulley 10.

The damper pulley 10 includes a hub 11, a pulley 12 as a mass body, and a damper elastic body 13 disposed between the hub 11 and the pulley 12. The hub 11 is an annular member centered about the axis x and includes a boss part 14 on the inner periphery side, a rim part 15 on the outer periphery side, and a disk part 16 having a substantially circular disk-like shape that connects the boss part 14 and the rim part 15 to each other. The hub 11 is molded or otherwise formed from a metal material, for example.

In the hub 11, the boss part 14 is an annular part that has a through-hole 14a and is centered about the axis x, and the disk part 16 extends in the outer periphery direction from an outer circumferential surface of an outer side part of the boss part 14. The boss part 14 has an outer circumferential surface 14b, which is a cylindrical outer periphery side surface of an inner side part thereof, and the outer circumferential surface 14b is a smooth surface and serves as a sealing surface for the oil seal 20 as described later. The rim part 15 is an annular, or more specifically, cylindrical part centered about the axis x, and the rim part 15 is a part located further on the outer periphery side than the boss part 14, concentrically with the boss part 14. The disk part 16 extends in the inner periphery direction from an inner circumferential surface 15a, which is a surface of the rim part 15 on the inner periphery side. The damper elastic body 13 is in pressure-contact with an outer circumferential surface 15b, which is a surface of the rim part 15 on the outer periphery side.

Figure 2:
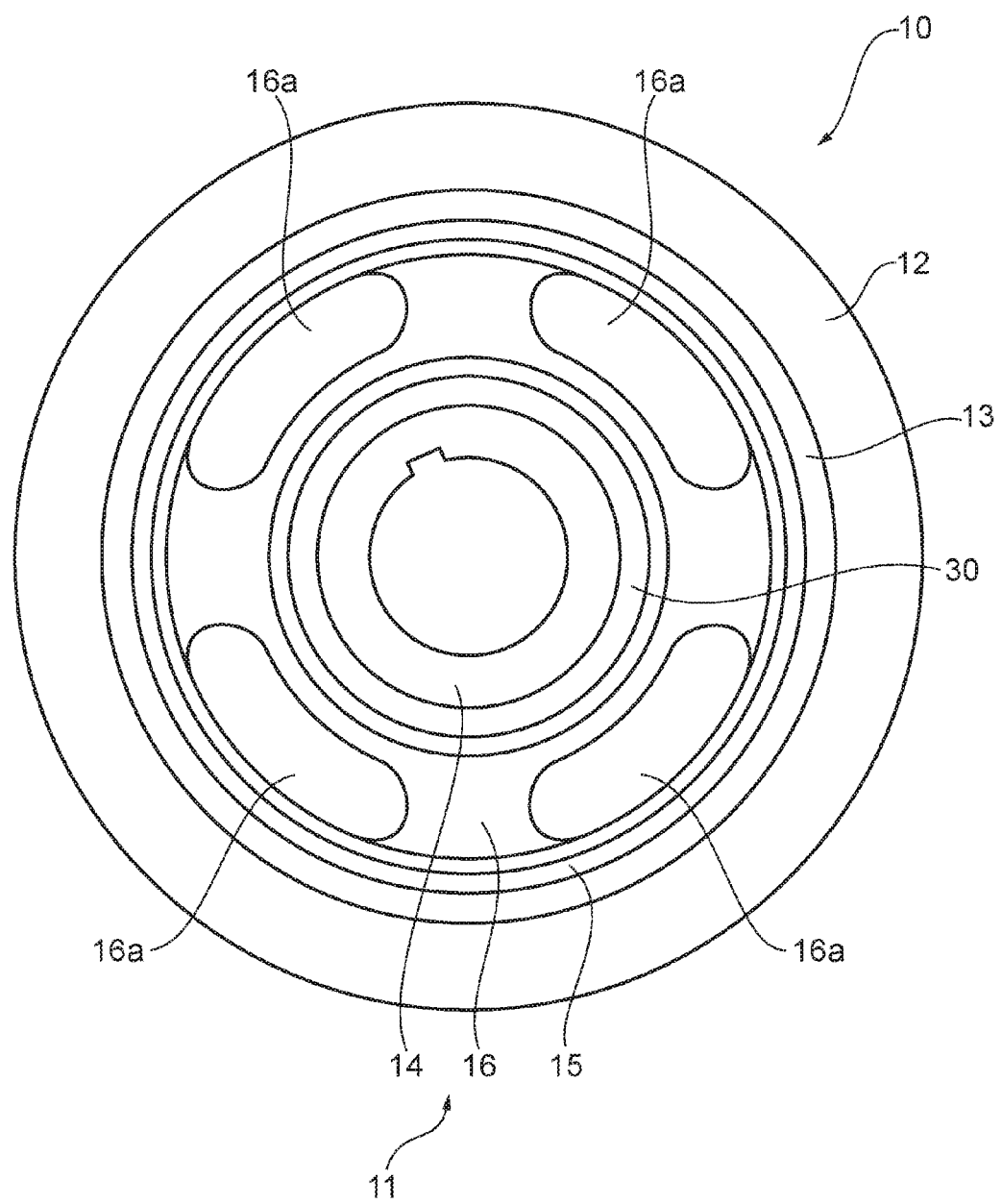
FIG. 2 is a rear view showing a schematic configuration of the torsional damper of the sealing structure shown in FIG. 1.

The disk part 16 extends between the boss part 14 and the rim part 15 and connects the boss part 14 and the rim part 15 to each other. The disk part 16 may extends in a direction perpendicular to the axis x or in a direction oblique to the axis x. The cross section of the disk part 16 taken along the axis x (also referred to as simply a "cross section") may be curved or straight. As shown in FIGS. 1 and 2, the disk part 16 has at least one window 16a, which is a through-hole penetrating the disk part 16 between the inner side and the outer side. According to this embodiment, four windows 16a are formed concentrically about the axis x and at regular angular intervals (see FIG. 2). The windows 16a are intended to reduce the weight of the hub 11 and thus the damper pulley 10.

The pulley 12 is an annular member centered about the axis x and is shaped to cover the hub 11 on the outer periphery side. More specifically, an inner circumferential surface 12a, which is a surface of the pulley 12 on the inner periphery side, has a shape that conforms to the shape of the outer circumferential surface 15b of the rim part 15 of the hub 11, and as shown in FIG. 1, the pulley 12 is positioned in such a manner that the inner circumferential surface 12a is radially opposed at a distance to the outer circumferential surface 15b of the rim part 15. In the outer circumferential surface 12b, which is a surface of the pulley 12 on the outer periphery side, a plurality of annular V-shaped grooves 12c are formed so that a timing belt (not shown) can be wound around the pulley 12.

The damper elastic body 13 is disposed between the pulley 12 and the rim part 15 of the hub 11. The damper elastic body 13 is a damper rubber member and is molded by cross-linking (vulcanization) of a rubber-like elastic material having high heat resistance, high cold resistance and high fatigue strength. The damper elastic body 13 is press-fitted between the pulley 12 and the rim part 15 of the hub 11, and fitted and fastened between the inner circumferential surface 12a of the pulley 12 and the outer circumferential surface 15b of the rim part 15.

In the damper pulley 10, the pulley 12 and the damper elastic body 13 form a damper section, and the natural frequency in the torsional direction of the damper section is tuned to agree with the natural frequency in the torsional direction of the crankshaft 51, which lies within a predetermined frequency range in which the torsional angle of the crankshaft 51 is at the maximum. That is, the inertial mass of the pulley 12 in the circumferential direction and the shear spring constant of the damper elastic body 13 in the torsional direction are adjusted so that the natural frequency in the torsional direction of the damper section agrees with the natural frequency in the torsional direction of the crankshaft 51.

The damper pulley 10 further has an annular hub pocket 30 centered about the axis x that is recessed in the direction toward the disk part 16 (the outer side direction) and circumferentially extends along the boss part 14 of the hub 11. The hub pocket 30 will be described in detail later with reference to FIG. 3.

As described above, the damper pulley 10 is attached to one end of the crankshaft 51 of the engine. More specifically, as shown in FIG. 1, the damper pulley 10 is fixed to the crankshaft 51 by inserting one end of the crankshaft 51 into the through-hole 14a of the boss part 14 of the hub 11 and screwing the bolt 52 into the crankshaft 51 from the outer side. A key to be engaged with the crankshaft 51 and the boss part 14, such as a Woodruff key, is provided between the crankshaft 51 and the boss part 14 to prevent the damper pulley 10 from rotating relative to the crankshaft 51.

When attached to the crankshaft 51, the damper pulley 10 is in a state where the inner part of the boss part 14 having the outer circumferential surface 14b is inserted in the through-hole 54 of the front cover 53, and there is an annular gap between the outer circumferential surface 14b of the boss part 14 and the through-hole 54 of the front cover 53.

As shown in FIG. 1, the oil seal 20 includes a reinforcing ring 21 that is made of a metal and has an annular shape centered about the axis x and an elastic body part 22 that is made of an elastic material and has an annular shape centered about the axis x. The elastic body part 22 is integrally attached to the reinforcing ring 21. The metal forming the reinforcing ring 21 may be stainless steel or SPCC (cold rolled steel sheet), for example. The elastic material forming the elastic body part 22 may be various rubber materials, for example. The various rubber materials include synthetic rubbers, such as nitrile rubber (NBR), hydrogenated nitrile rubber (H-NBR), acrylic rubber (ACM) or fluororubber (FKM).

The reinforcing ring 21 has a substantially L-shaped cross section and has a disk part 21a and a cylindrical part 21b, for example. The disk part 21a is a hollow disk-shaped part that extends in a direction substantially perpendicular to the axis x, and the cylindrical part 21b is a cylindrical part that extends inwardly in the direction of the axis x from an outer periphery side end of the disk part 21a.

The elastic body part 22 is attached to the reinforcing ring 21. In this embodiment, the elastic body part 22 is formed integrally with the reinforcing ring 21 to cover the reinforcing ring 21 from the outer side and the outer periphery side. The elastic body part 22 includes a lip waist part 23, a seal lip 24, and a dust lip 25. As shown in FIG. 1, the lip waist part 23 is a part located in the vicinity of an inner periphery side end of the disk part 21a of the reinforcing ring 21, and the seal lip 24 is a part that extends toward the inner side from the lip waist part 23 and is placed to be opposed to the cylindrical part 21b of the reinforcing ring 21. The dust lip 25 extends from the lip waist part 23 in the direction of the axis x.

The seal lip 24 has, at the inner side end, an annular lip tip end part 24a having a cross section whose shape is a wedge shape protruding in the inner periphery side direction. The lip tip end part 24a is shaped to come into close contact with the outer circumferential surface 14b in a manner such that the outer circumferential surface 14b of the boss part 14 of the hub 11 is slidable, and to form a seal between the lip tip end part 24a and the damper pulley 10, as described later. On the outer peripheral part side of the seal lip 24, a garter spring 26 is fitted, and the garter spring 26 radially inwardly biases the seal lip 24.

The dust lip 25 is a part that extends from the lip waist part 23 toward the outer side and the inner periphery side. The dust lip 25 prevents entry of foreign matter toward the lip tip end part 24a during use.

The elastic body part 22 includes a rear cover 27 and a gasket part 28. The rear cover 27 covers the disk part 21a of the reinforcing ring 21 from the outer side, and the gasket part 28 covers the cylindrical part 21b of the reinforcing ring 21 from the outer periphery side.

The oil seal 20 includes a side lip 29 that extends in the outer side direction. The side lip 29 will be described in detail later with reference to FIG. 3.

The reinforcing ring 21 is manufactured by press working or forging for example, and the elastic body part 22 is molded with a mold by cross-linking (vulcanization). In the cross-linking, the reinforcing ring 21 is placed inside the mold, and the elastic body part 22 is bonded to the reinforcing ring 21 by cross-linking (vulcanization) bonding, and then the elastic body part 22 is integrally molded with the reinforcing ring 21.

As described above, the oil seal 20 seals the gap formed between the through-hole 54 of the front cover 53 and the outer circumferential surface 14b of the boss part 14 of the damper pulley 10. More specifically, the oil seal 20 is press-fitted into the through-hole 54 of the front cover 53, and the gasket part 28 of the elastic body part 22 is compressed and abuts in a fluid tight manner against an inner circumferential surface 54a, which is the inner periphery side surface of the through-hole 54. Thus, a seal is formed between the oil seal 20 and the through-hole 54 of the front cover 53. On the other hand, the lip tip end part 24a of the seal lip 24 abuts in a fluid tight manner against the outer circumferential surface 14b of the boss part 14 of the hub 11, and thus, a seal is formed between the oil seal 20 and the damper pulley 10.

Figure 3:
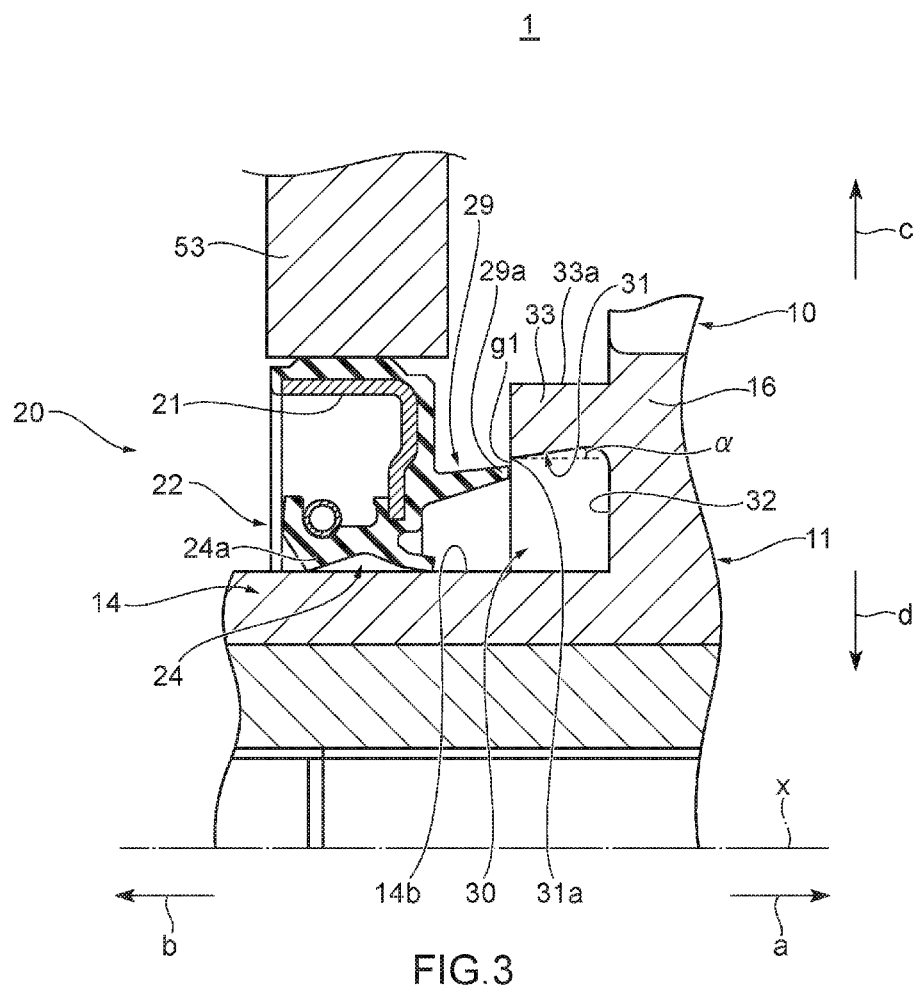
FIG. 3 is a partial enlarged view of the sealing structure with a torsional damper and an oil seal shown in FIG. 1.

Next, the hub pocket 30 of the damper pulley 10 and the side lip 29 of the oil seal 20 will be described with reference to FIG. 3. FIG. 3 is a partial enlarged view of the sealing structure 1 with a torsional damper and an oil seal.

As shown in FIG. 3, the hub pocket 30 is an annular recess that is formed in the damper pulley 10 on the inner side rather than the disk part 16, is recessed toward the disk part 16 and extends to surround the outer circumferential surface 14b of the boss part 14. More specifically, the hub pocket 30 includes an annular outer circumferential surface 31 that is opposed to the outer circumferential surface 14b of the boss part 14 at the outer periphery side, and a bottom surface 32 that extends between the outer circumferential surface 31 and the outer circumferential surface 14b of the boss part 14. The hub pocket 30 is defined by the outer circumferential surface 31, the bottom surface 32 and the outer circumferential surface 14b of the boss part 14.

The outer circumferential surface 31 of the hub pocket 30 increases in the diameter toward a disk part 16 direction in the direction of the axis x (the outer side direction) and is an annular surface expanding toward the outer periphery side, toward the disk part 16 direction in the direction of the axis x (the outer side direction). For example, the outer circumferential surface 31 is a tapered surface in a substantially conical surface shape.

The hub pocket 30 may be formed by an annular projection that extends in the inner side direction from the disk part 16 of the hub 11 or by forming a recess that is recessed in the outer side direction in the disk part 16. Alternatively, the hub pocket 30 may be formed by a combination of the projection and the recess. In the case where the hub pocket 30 is formed by an annular projection that extends in the inner side direction from the disk part 16, an inner circumferential surface of the projection constitutes the outer circumferential surface 31 of the hub pocket 30. In the case where the hub pocket 30 is formed by forming a recess that is recessed in the outer side direction in the disk part 16, an outer circumferential surface of the recess constitutes the outer circumferential surface 31 of the hub pocket 30. In this embodiment, as shown in FIG. 3, an annular projection 33 that protrudes in the inner side direction in the axis x direction from the disk part 16 of the hub 11 is formed, and the projection 33 provides the outer circumferential surface 31 and thus the hub pocket 30 is formed.

The bottom surface 32 of the hub pocket 30 may be formed by an inner side surface of the disk part 16 of the hub 11, may be formed on the inner side rather than the inner side surface of the disk part 16 of the hub 11, or may be formed by forming a recess in the inner side surface of the disk part 16 of the hub 11.

A diameter-increasing angle $\alpha$, which is the angle of the above described the diameter-increasing outer circumferential surface 31 of the hub pocket 30 with respect to the axis x, is set at a predetermined value. More specifically, as shown in FIG. 3, the diameter-increasing angle $\alpha$ is the angle between the axis x (or a straight line parallel with the axis x) and the outer circumferential surface 31 in cross section. The diameter-increasing angle $\alpha$ of the outer circumferential surface 31 of the hub pocket 30 is greater than 0°, preferably equal to or greater than 4° and equal to or smaller than 18°, more preferably equal to or greater than 5° and equal to or smaller than 16°, or even more preferably equal to or greater than 7° and equal to or smaller than 15°. In this way, the outer circumferential surface 31 of the hub pocket 30 is inclined toward the outer periphery side with respect to the axis x by the diameter-increasing angle $\alpha$.

As shown in FIG. 3, the side lip 29 of the oil seal 20 extends in the outer side direction. More specifically, the side lip 29 extends in parallel with the axis x or in a direction oblique to the axis x in the outer side direction and the outer periphery side direction. An outer end 29a, which is an outer side end of the side lip 29, is located in the radial direction on the inner periphery side rather than an inner end 31a, which is an inner side end of the outer circumferential surface 31 of the hub pocket 30, and does not enter the inside of the hub pocket 30 in the direction of the axis x (the outer side direction). In other words, the side lip 29 of the oil seal 20 and the outer circumferential surface 31 of the hub pocket 30 do not overlap with each other in the radial direction.

With the side lip 29 and the hub pocket 30, an annular gap g1 is formed between the outer end 29a of the side lip 29 and the inner end 31a of the outer circumferential surface 31 of the hub pocket 30.

The annular gap g1 formed between the outer end 29a of the side lip 29 and the inner end 31a of the outer circumferential surface 31 of the hub pocket 30 provides a labyrinth seal. Therefore, even if foreign matter, such as muddy water, sand, or dust, enters from the outside not only through a gap between the damper pulley 10 and the front cover 53 but also through the windows 16a of the disk part 16 of the hub 11, the labyrinth seal (the gap g1) formed by the side lip 29 and the hub pocket 30 reduces entry of the foreign matter further toward the seal lip 24 side. In this way, exposure of the seal lip 24 of the oil seal 20 to foreign matter entering from around the damper pulley 10 as described above can be reduced. Thus, damage to or deterioration of the lip tip end part 24a due to the lip tip end part 24a catching foreign matter can be reduced, and thus deterioration of the sealing performance of the oil seal 20 that leads to oil leakage can be reduced. The foreign matter that enters from around the damper pulley 10 includes foreign matter that enters from the outside through any gap between the damper pulley 10 and the front cover 53 and foreign matter that enters from the outside through the windows 16a of the disk part 16 of the hub 11.

Since the outer circumferential surface 31 of the hub pocket 30 that forms the labyrinth seal (the gap g1) has the diameter-increasing shape r toward the outer side as described above, at the labyrinth seal, entry of foreign matter further toward the seal lip 24 side can be more effectively reduced.

Since the outer circumferential surface 31 of the hub pocket 30 that forms the labyrinth seal (the gap g1) has the diameter-increasing shape at the predetermined diameter-increasing angle $\alpha$ toward the outer side as described above, at the labyrinth seal, entry of foreign matter further toward the seal lip 24 side can be more effectively reduced.

As described above, the sealing structure 1 with a torsional damper and an oil seal according to the first embodiment of the present disclosure can reduce exposure of the seal lip 24 of the oil seal 20 to foreign matter that enters from around the damper pulley 10 including not only foreign matter that enters through any gap between the damper pulley 10 and the front cover 53, but also foreign matter that enters through the windows 16a of the damper pulley 10.

An outer circumferential surface 33a (see FIG. 3), which is an outer periphery side surface of the projection 33 forming the hub pocket 30, may form an annular surface that diverges toward the outer periphery side, toward the inner side in the direction of the axis x, such as a tapered surface in a conical surface shape. In that case, foreign matter entering from around the damper pulley 10 can be accumulated on the outer circumferential surface 33a of the projection 33 and prevented from reaching the oil seal 20. The foreign matter accumulated on the outer circumferential surface 33a of the projection 33 can be discharged downward under its own weight or by rotation of the damper pulley 10.

Next, the sealing performance of the sealing structure 1 with a torsional damper and an oil seal according to this embodiment of the present disclosure will be described.

Evaluation Test 1: Evaluation of Diameter-Increasing angle $\alpha$

Figure 4:
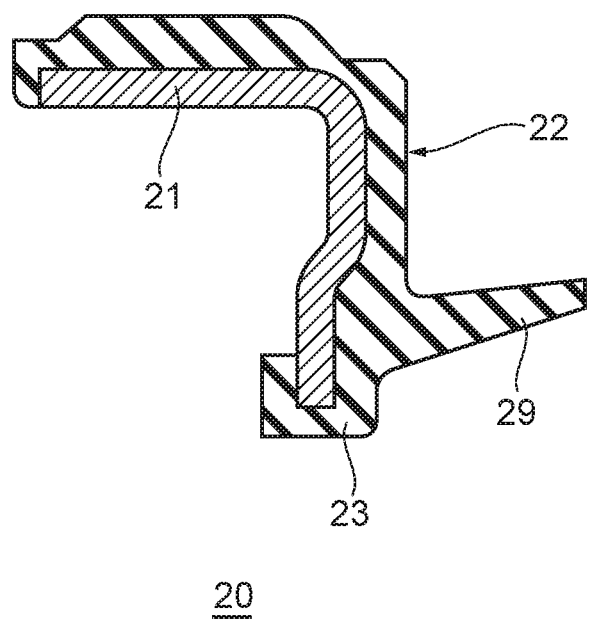
FIG. 4 is a partial cross-sectional view taken along the axis, showing a schematic configuration of an oil seal for evaluation test in test examples of the sealing structure with a torsional damper and an oil seal according to the present disclosure.

The inventor fabricated sealing structures 1 with a torsional damper and an oil seal according to the first embodiment of the present disclosure with different diameter-increasing angles $\alpha$ (test examples 1 to 4), and conducted an evaluation test on the sealing performance of the sealing structures 1 with a torsional damper and an oil seal. Note that the test example 4 was a sealing structure 1 with a torsional damper and an oil seal according to the first embodiment of the present disclosure that had a diameter-increasing angle $\alpha$ of 0°. For convenience of evaluation of the sealing performance, in the examples 1 to 4, the seal lip 24, the dust lip 25 and the garter spring 26 of the elastic body part 22 of the oil seal 20 were omitted (see FIG. 4).

In the test example 1, the diameter-increasing angle $\alpha$ of the outer circumferential surface 31 of the hub pocket 30 was 7.2°, and a diameter $\varphi$ of the outer circumferential surface 31 of the hub pocket 30 at the inner end 31a was 52.0 mm. In the test example 2, the diameter-increasing angle $\alpha$ was 14.4°, and the diameter $\varphi$ of the outer circumferential surface 31 of the hub pocket 30 at the inner end 31a was 52.0 mm. In the test example 3, the diameter-increasing angle $\alpha$ was 21.6°, and the diameter φ of the outer circumferential surface 31 of the hub pocket 30 at the inner end 31a was 52.0 mm. In the test example 4, the diameter-increasing angle α was 0°, and the diameter φ of the outer circumferential surface 31 of the hub pocket 30 at the inner end 31a was 54.2 mm. In the test examples 1 to 4, the amount of overlap (overlap amount) between the side lip 29 and the outer circumferential surface 31 of the hub pocket 30 in the direction of the axis x was 0 mm. In the test examples 1 to 4, the reinforcing ring 21 and the elastic body part 22 were made of EPDM and FC250, respectively.

Figure 5B:
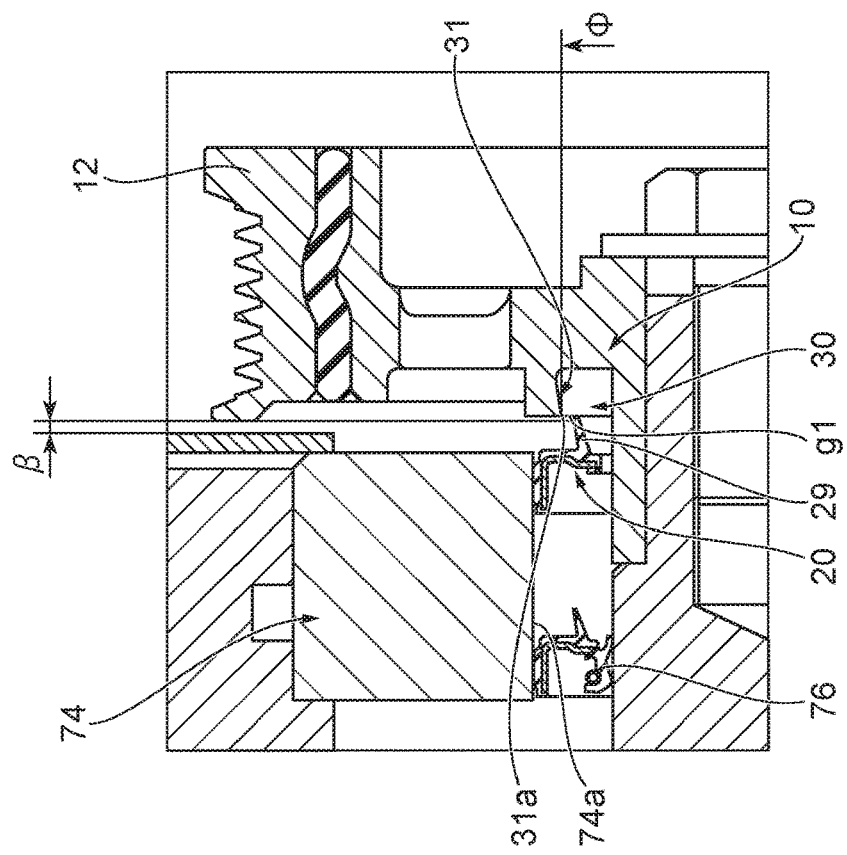
FIG. 5B is a partial enlarged cross-sectional view.
Figure 5A:
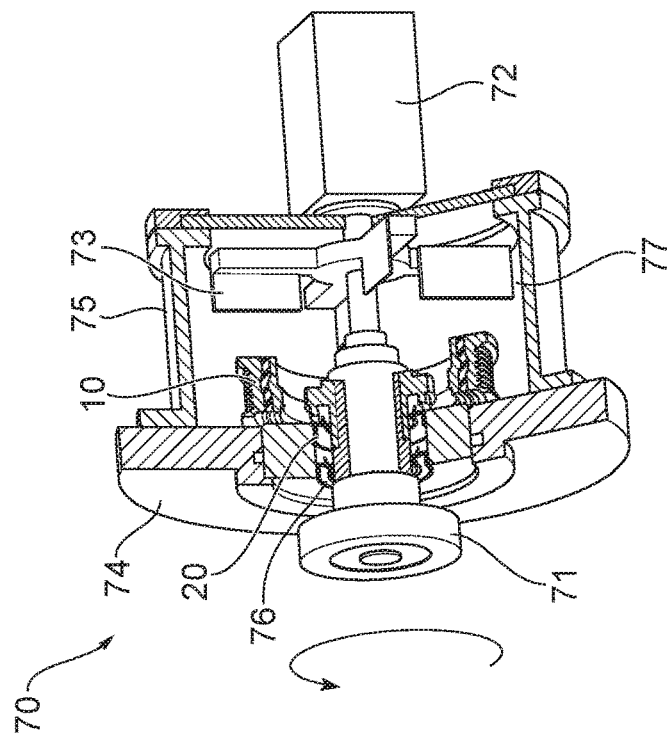
FIGS. 5A and B are diagrams showing a schematic configuration of a sealing performance tester used for the evaluation test on the sealing performance.

FIGS. 5A and 5B are diagrams showing a schematic configuration of a sealing performance tester 70 used for the evaluation test on the sealing performance described above. FIG. 5A is a partial cross-sectional perspective view, and FIG. 5B is a partial enlarged cross-sectional view. As shown in FIGS. 5A and 5B, the sealing performance tester 70 includes a dummy crankshaft 71 that can be rotated by a motor (not shown), stirring blades 73 that can be rotated by a motor 72, and a dummy front cover 74. A cylindrical cover 75 is attached to the dummy front cover 74. The cover 75 houses the sealing structure with a torsional damper and an oil seal according to the test example 1 to 4 and the stirring blade 73 and provides a sealed space around the sealing structure and the stirring blade 73. A seal member 76 that seals the gap between the dummy crankshaft 71 and the dummy front cover 74 from the outside is attached to the exterior of the oil seal of the test example 1 to 4 in a through-hole 74a of the dummy front cover 74. In this way, in the sealing performance tester 70, the peripheral space around the sealing structure with a torsional damper and an oil seal according to the test example 1 to 4 is sealed. Inside the cover 75, dust 77 as foreign matter is accumulated. The dust 77 used is JIS test powder 1 (class 1 and 8) or test powder class 1 or 3 described in JIS Z8901: 2006 (referred to also as "JIS class 1" or "JIS class 3", respectively). As shown in FIG. 5B, a distance β in the axial direction between the dummy front cover 74 and the pulley 12 of the damper pulley 10 is 2.5 mm.

Figure 6:
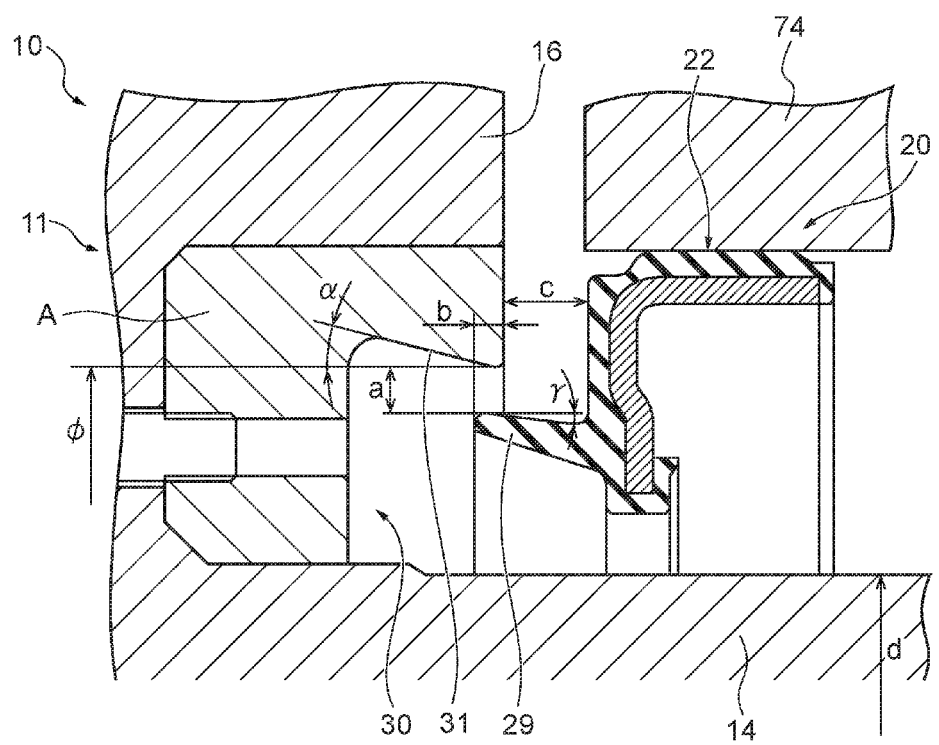
FIG. 6 is an enlarged view of a hub pocket and its periphery of the sealing structure with a torsional damper and an oil seal used for the evaluation test.

FIG. 6 is an enlarged view of the hub pocket 30 and its periphery of the sealing structure 1 with a torsional damper and an oil seal used for the evaluation test. As shown in FIG. 6, a damper pulley 10 is used in the evaluation test, the hub pocket 30 formed in the damper pulley 10 is provided by forming an annular recess centered about the axis x in the hub 11 of the damper pulley 10 and removably fixing an attachment A, which is an annular member having a groove corresponding to the hub pocket 30, in the recess. For the sake of convenience, FIG. 6 shows that the side lip 29 is shown as overlapping with the hub pocket 30.

The evaluation test on the sealing performance was conducted by rotating the stirring blades 73 with the motor 72 to stir the dust accumulated in the cover 75 and measuring the amount of dust passing through the gap g1 between the side lip 29 and the hub pocket 30 (dust entry amount). In the evaluation test, the dummy crankshaft 71 was rotated to bring the state of the damper pulley 10 and the oil seal 20 close to the state in use, and the ambient temperature was room temperature. The evaluation test lasted for 1 hour.

The result of this evaluation test on the sealing performance is shown in the following table 1.

TABLE 1

|  | Test example 1 | Test example 2 | Test example 3 | Test example 4 |
| --- | --- | --- | --- | --- |
| Diameter-increasing angle α (°) | 7.2 | 14.4 | 21.6 | 0 |
| Diameter φ (mm) | 52.0 | 52.0 | 52.0 | 54.2 |
| Dust entry amount (g) | 2.1 | 1.0 | 8.1 | 4.8 |

As shown in the table 1, comparison between the test example 4 in which the diameter-increasing angle α is 0° and the test examples 1 and 2 in which the diameter-increasing angle α is greater than 0° shows that the labyrinth seals (the gap g1) formed by the hub pocket 30 having a diameter-increasing angle α greater than 0° and the side lip 29 have higher sealing performances. In the test examples 1 and 2 in which the diameter-increasing angle α falls within the range in which diameter-increasing angle α is equal to or greater than 4° and equal to or less than 18°, the dust entry amount is 2.1 g and 1.0 g, respectively, and the labyrinth seal (the gap g1) formed by the side lip 29 and the hub pocket 30 has a higher sealing performance. To the contrary, in the test example 3 in which the diameter-increasing angle α does not fall within the range in which the diameter-increasing angle α is equal to or greater than 4° and equal to or less than 18°, the dust entry amount is 8.1 g, and the labyrinth seal (the gap g1) formed by the side lip 29 and the hub pocket 30 has a lower sealing performance than the labyrinth seals in the test examples 1 and 2. This shows that the sealing structures 1 with a torsional damper and an oil seal according to the test examples 1 and 2 can substantially reduce exposure of the seal lip 24 of the oil seal 20 to foreign matter entering from around the damper pulley 10. In other words, the sealing structures 1 with a torsional damper and an oil seal that has a diameter-increasing angle α falling within the range in which diameter-increasing angle α is equal to or greater than 4° and equal to or less than 18° can substantially reduce the possibility of exposure of the seal lip 24 of the oil seal 20 to foreign matter entering from around the damper pulley 10.

Evaluation Test 2: Evaluation of Gap Angle Difference δ

The inventor fabricated sealing structures 1 with a torsional damper and an oil seal according to the first embodiment of the present disclosure described above that had different combinations of the diameter-increasing angle α of the outer circumferential surface 31 of the hub pocket 30 and the inclination angle (inclination angle γ) of the side lip 29 with respect to the axis x (see FIG. 6) (test examples 11 to 20), and conducted an evaluation test on the sealing performance of the sealing structures with a torsional damper and an oil seal. Note that the test example 11 was a sealing structure 1 with a torsional damper and an oil seal according to the first embodiment of the present disclosure described above that had a diameter-increasing angle α of 0°. The evaluation test on the sealing performance of the sealing structures according to the test examples 11 to 20 was conducted in the same manner as the evaluation test on the sealing structures according to the test examples 1 to 4 described above, using the same test sealing apparatus (see FIGS. 4 and 6) and the same sealing performance tester 70 (see FIGS. 5A and 5B).

In the test examples 11 to 15, the inclination angle γ of the side lip 29 with respect to the axis x was 7.2°, the diameter-increasing angle α of the outer circumferential surface 31 of the hub pocket 30 varied between the test examples, and therefore, the difference between the diameter-increasing angle α of the hub pocket 30 and the inclination angle γ of the side lip 29 (the gap angle difference δ=α−γ) varied between the test examples. In the test examples 16 to 20, the inclination angle γ of the side lip 29 was 19.3°, the diameter-increasing angle α of the hub pocket 30 varied between the test examples, and therefore, the gap angle difference δ varied between the test examples.

Specifically, in the test example 11, the diameter-increasing angle α of the hub pocket 30 was 0°, and the gap angle difference δ was −7.2°. The negative value of the gap angle difference δ means that the side lip 29 is more inclined than the outer circumferential surface 31 of the hub pocket 30. In the test example 12, the diameter-increasing angle α of the hub pocket 30 was 7.2°, and the gap angle difference δ was 0°. In the test example 13, the diameter-increasing angle α of the hub pocket 30 was 14.4°, and the gap angle difference δ was 7.2°. In the test example 14, the diameter-increasing angle α of the hub pocket 30 was 19.3°, and the gap angle difference δ was 12.1°. In the test example 15, the diameter-increasing angle α of the hub pocket 30 was 21.6°, and the gap angle difference δ was 14.4°. In the test example 16, the diameter-increasing angle α of the hub pocket 30 was 19.3°, and the gap angle difference δ was 0°. In the test example 17, the diameter-increasing angle α of the hub pocket 30 was 21.6°, and the gap angle difference δ was 2.3°. In the test example 18, the diameter-increasing angle α of the hub pocket 30 was 26.5°, and the gap angle difference δ was 7.2°. In the test example 19, the diameter-increasing angle α of the hub pocket 30 was 31.4°, and the gap angle difference δ was 12.1°. In the test example 20, the diameter-increasing angle α of the hub pocket 30 was 33.7°, and the gap angle difference δ was 14.4°.

Figure 7:
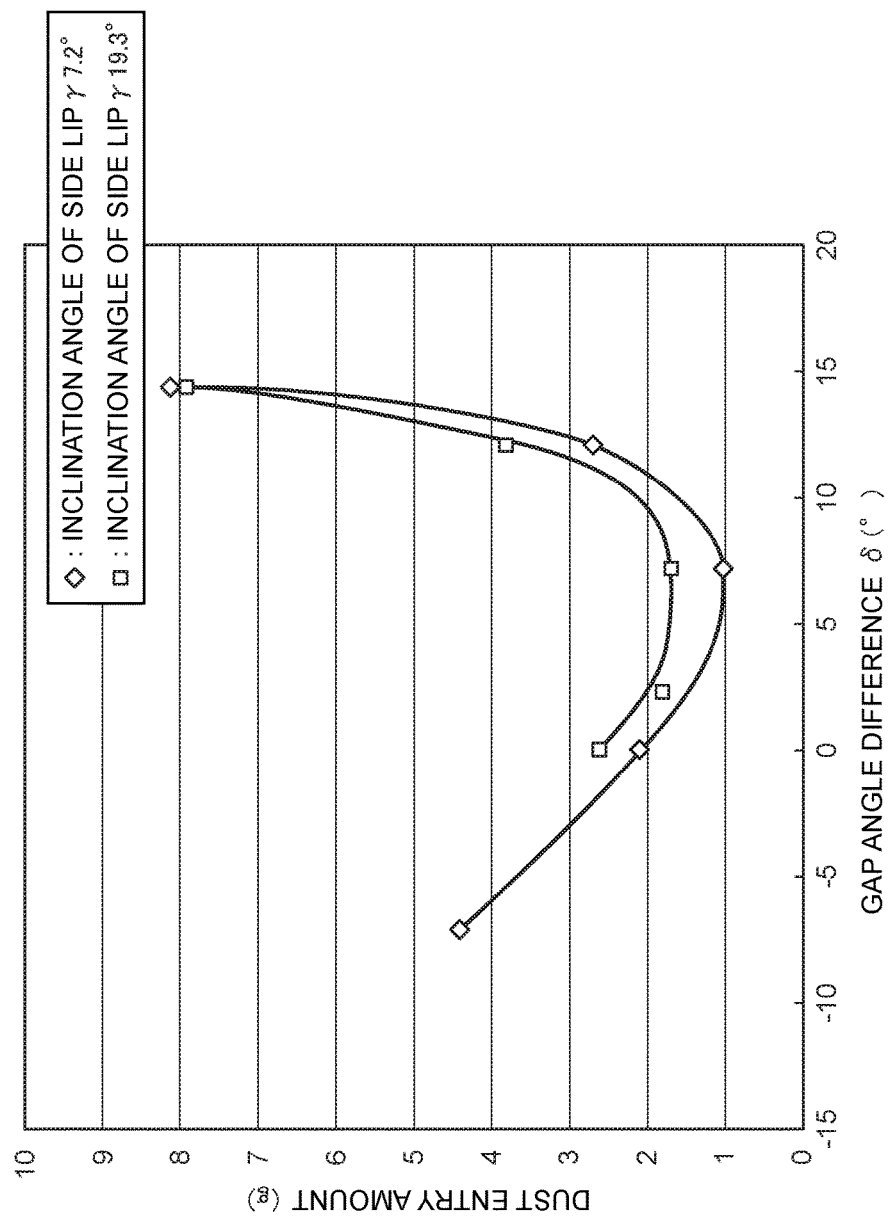
FIG. 7 is a graph showing a relationship between the gap angle difference and the dust entry amount of the sealing structure shown in FIG. 1.

The result of this evaluation test on the sealing performance is shown in FIG. 7 and the following table 2.

TABLE 2

| Test example | 11 | 12 | 13 | 14 | 15 | 16 | 17 | 18 | 19 | 20 |
|---|---|---|---|---|---|---|---|---|---|---|
| Diameter-increasing angle α (°) | 0 | 7.2 | 14.4 | 19.3 | 21.6 | 19.3 | 21.6 | 26.5 | 31.4 | 33.7 |
| Inclination angle γ (°) | 7.2 | 7.2 | 7.2 | 7.2 | 7.2 | 19.3 | 19.3 | 19.3 | 19.3 | 19.3 |
| Gap angle difference δ (°) | −7.2 | 0 | 7.2 | 12.1 | 14.4 | 0 | 2.3 | 7.2 | 12.1 | 14.4 |
| Dust entry amount (g) | 4.4 | 2.1 | 1.0 | 2.7 | 8.1 | 2.6 | 1.8 | 1.7 | 3.8 | 7.9 |

As shown in FIG. 7 and the table 2, this evaluation test shows that there is a correlation between the gap angle difference δ and the dust entry amount. Whether the inclination angle γ of the side lip 29 is 7.2° or 19.3°, it is observed that the dust entry amount tends to be reduced if the gap angle difference δ is equal to or greater than 1.0° and equal to or smaller than 11.0°, further reduced if the gap angle difference δ is equal to or greater than 2.0° and equal to or smaller than 9.0°, and even further reduced if the gap angle difference δ is equal to or greater than 3.0° and equal to or smaller than 8.0°. In addition, whether the inclination angle γ of the side lip 29 is 7.2° or 19.3°, it is observed that the dust entry amount tends to be most significantly reduced if the gap angle difference δ is 7.2°. This evaluation result shows that, regardless of the value of the inclination angle γ of the side lip 29, the dust entry amount can be effectively reduced if the gap angle difference δ falls within the range from 1.0° to 11.0°, be more effectively reduced if the gap angle difference δ falls within the range from 2.0° to 9.0°, and be even more effectively reduced if the gap angle difference δ falls within the range from 3.0° to 8.0°. This result also shows that the gap angle difference δ of 7.2° is most preferable, regardless of the value of the inclination angle γ of the side lip 29 for reducing the dust entry amount.

Evaluation Test 3: Evaluation of Shaft Diameter of Boss Part of Damper Pulley

The inventor fabricated sealing structures 1 with a torsional damper and an oil seal according to the first embodiment of the present disclosure described above that had different combinations of a shaft diameter d (see FIG. 6), which is the diameter of the shaft of the boss part 14 of the damper pulley 10, and the gap angle difference δ (test examples 21 to 33), and conducted an evaluation test on the sealing performance of the sealing structures with a torsional damper and an oil seal. Note that the test examples 21, 25 and 30 were sealing structures 1 with a torsional damper and an oil seal according to the first embodiment of the present disclosure described above that had a diameter-increasing angle α of 0°. The shaft diameter d of the boss part 14 was 35 mm in the test examples 21 to 24, 42 mm in the test examples 25 to 29, and 50 mm in the test examples 30 to 33. The evaluation test on the sealing performance of the sealing structures according to the test examples 21 to 33 was conducted in the same manner as the evaluation test on the sealing structures according to the test examples 1 to 4 described above, using the same test sealing apparatus (see FIGS. 4 and 6) and the same sealing performance tester 70 (see FIGS. 5A and 5B). In this evaluation test, the inclination angle γ of the side lip 29, a gap width a, which is the width of the gap g1 in the radial direction, an overlap amount b, which is the amount of overlap between the side lip 29 and the hub pocket 30, and a distance c, which is the distance in the direction of the axis x between the disk part 16 of the damper pulley 10 and the oil seal 20 did not differ between the sealing structures with different shaft diameters d. The overlap amount b was 0, and the inclination angle γ of the side lip 29 was 7.2°.

Specifically, in the test example 21, the diameter-increasing angle α of the hub pocket 30 was 0°, and the gap angle difference δ was −7.2°. In the test example 22, the diameter-increasing angle α of the hub pocket 30 was 7.2°, and the gap angle difference δ was 0°. In the test example 23, the diameter-increasing angle α of the hub pocket 30 was 14.4°, and the gap angle difference δ was 7.2°. In the test example 24, the diameter-increasing angle α of the hub pocket 30 was 21.6°, and the gap angle difference δ was 14.4°. In the test example 25, the diameter-increasing angle α of the hub pocket 30 was 0°, and the gap angle difference δ was −7.2°. In the test example 26, the diameter-increasing angle α of the hub pocket 30 was 7.2°, and the gap angle difference δ was 0°. In the test example 27, the diameter-increasing angle α of the hub pocket 30 was 14.4°, and the gap angle difference δ was 7.2°. In the test example 28, the diameter-increasing angle α of the hub pocket 30 was 19.3°, and the gap angle difference δ was 12.1°. In the test example 29, the diameter-increasing angle α of the hub pocket 30 was 21.6°, and the gap angle difference δ was 14.4°. In the test example 30, the diameter-increasing angle α of the hub pocket 30 was 0°, and the gap angle difference δ was −7.2°. In the test example 31, the diameter-increasing angle α of the hub pocket 30 was 7.2°, and the gap angle difference δ was 0°. In the test example 32, the diameter-increasing angle α of the hub pocket 30 was 14.4°, and the gap angle difference δ was 7.2°. In the test example 33, the diameter-increasing angle α of the hub pocket 30 was 21.6°, and the gap angle difference δ was 14.4°.

Figure 8:
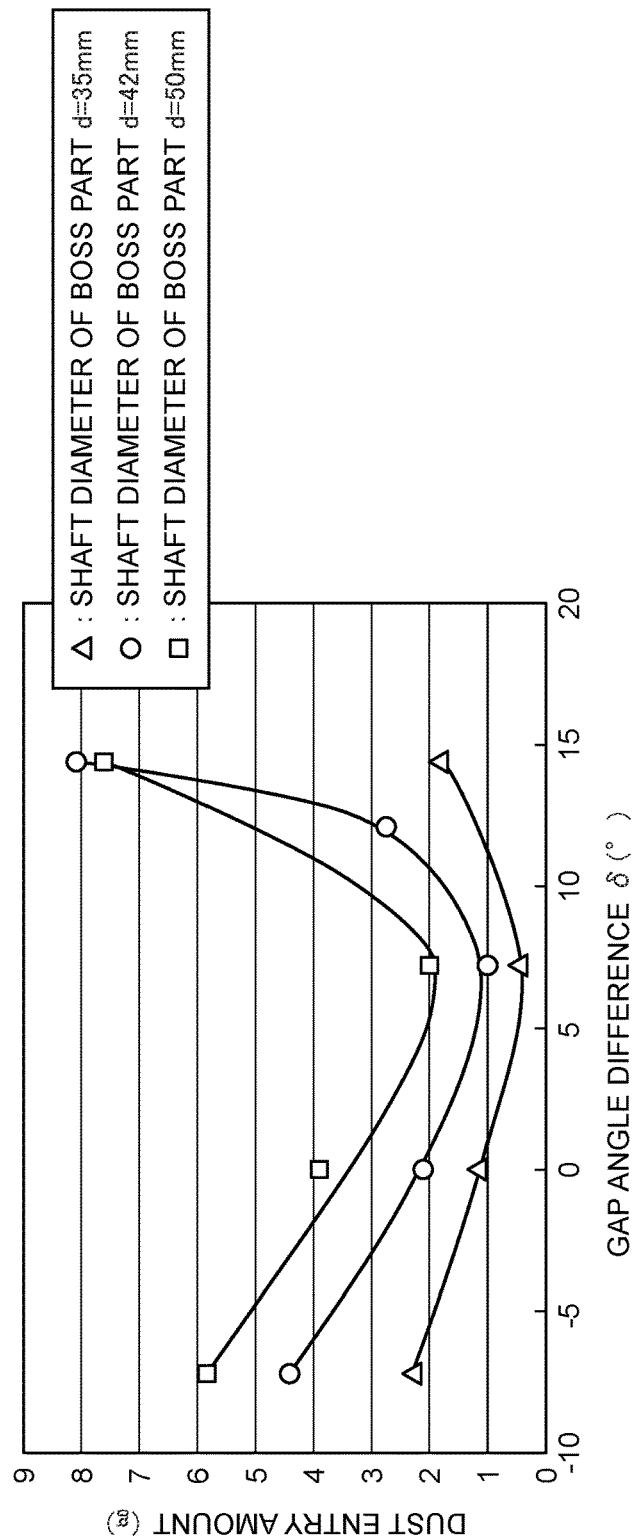
FIG. 8 is a graph showing a relationship between the shaft diameter of a boss part of a damper pulley and the dust entry amount of the sealing structure shown in FIG. 1.

The result of this evaluation test on the sealing performance is shown in FIG. 8 and the following table 3.

TABLE 3

| Test example | 21 | 22 | 23 | 24 | 25 | 26 | 27 | 28 | 29 | 30 | 31 | 32 | 33 |
|---|---|---|---|---|---|---|---|---|---|---|---|---|---|
| Shaft diameter d (mm) | 35 | 35 | 35 | 35 | 42 | 42 | 42 | 42 | 42 | 50 | 50 | 50 | 50 |
| Diameter-increasing angle α (°) | 0 | 7.2 | 14.4 | 21.6 | 0 | 7.2 | 14.4 | 19.3 | 21.6 | 0 | 7.2 | 14.4 | 21.6 |
| Inclination angle γ (°) | 7.2 | 7.2 | 7.2 | 7.2 | 7.2 | 7.2 | 7.2 | 7.2 | 7.2 | 7.2 | 7.2 | 7.2 | 7.2 |
| Gap angle difference δ (°) | −7.2 | 0 | 7.2 | 14.4 | −7.2 | 0 | 7.2 | 12.1 | 14.4 | −7.2 | 0 | 7.2 | 14.4 |
| Dust entry amount (g) | 2.3 | 1.2 | 0.5 | 1.8 | 4.4 | 2.1 | 1.0 | 2.7 | 8.1 | 5.8 | 3.9 | 2.0 | 7.6 |

As shown in FIG. 8 and the table 3, this evaluation test shows that the sealing structures having shaft diameters d of 35 mm, 42 mm and 50 mm have the same correlation between the gap angle difference δ and the dust entry amount as observed in the evaluation test 2 described above. That is, in the sealing structures having shaft diameters d of 35 mm, 42 mm and 50 mm, it is observed that the dust entry amount tends to be reduced if the gap angle difference δ is equal to or greater than 1.0° and equal to or smaller than 11.0°, further reduced if the gap angle difference δ is equal to or greater than 2.0° and equal to or smaller than 9.0°, and even further reduced if the gap angle difference δ is equal to or greater than 3.0° and equal to or smaller than 8.0°. In addition, in the sealing structures having shaft diameters d of 35 mm, 42 mm and 50 mm, it is observed that the dust entry amount is most significantly reduced if the gap angle difference δ is 7.2°. This evaluation result shows that, in the sealing structures 1 having different shaft diameters d of the boss part 14, the dust entry amount can be reduced if the gap angle difference δ falls within the range from 1.0° to 11.0°, be more significantly reduced if the gap angle difference δ falls within the range from 2.0° to 9.0°, and be even more significantly reduced if the gap angle difference δ falls within the range from 3.0° to 8.0°. This result also shows that, in the sealing structures 1 having different shaft diameters d of the boss part 14, the dust entry amount can be most significantly reduced if the gap angle difference δ is 7.2°. Thus, it can be seen that the dust entry amount is at the minimum if the gap angle difference δ is 7.2°, regardless of the value of the shaft diameter d of the boss part 14. This evaluation test also shows that the dust entry amount increases as the passage area of the gap g1 increases, that is, the shaft diameter d increases.

Evaluation Test 4: Evaluation of Gap Width a of Gap g1

The inventor fabricated sealing structures 1 with a torsional damper and an oil seal according to the first embodiment of the present disclosure described above that had different gap widths a of the gap g1 formed between the side lip 29 and the hub pocket 30 (test examples 41 to 44), and conducted an evaluation test on the sealing performance of the sealing structures with a torsional damper and an oil seal. The evaluation test on the sealing performance of the sealing structures according to the test examples 41 to 44 was conducted in the same manner as the evaluation test on the sealing structures according to the test examples 1 to 4 described above, using the same test sealing apparatus (see FIGS. 4 and 6) and the same sealing performance tester 70 (see FIGS. 5A and 5B). The diameter-increasing angle α of the hub pocket 30, the inclination angle γ of the side lip 29, the overlap amount b between the side lip 29 and the hub pocket 30, the distance c between the disk part 16 of the damper pulley 10 and the oil seal 20, and the shaft diameter d of the boss part 14 did not differ between the test examples 41 to 44. The overlap amount b was 0, and the inclination angle γ of the side lip 29 was 7.2°.

Specifically, the gap width a of the gap g1 was 2.1 mm in the test example 41, 1.6 mm in the test example 42, 1.1 mm in the test example 43 and 0.6 mm in the test example 44.

Figure 9:
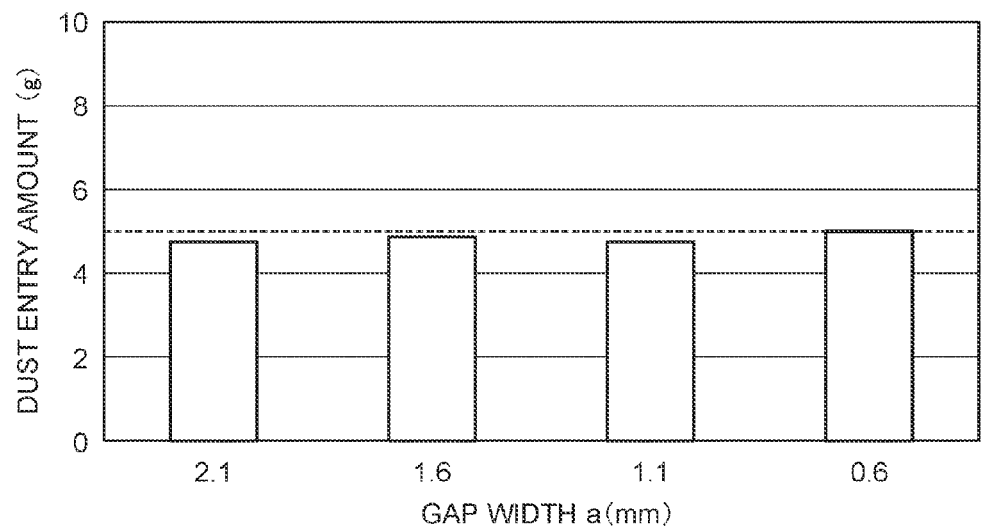
FIG. 9 is a graph showing a relationship between the gap width of a gap formed between a side lip and the hub pocket and the dust entry amount of the sealing structure shown in FIG. 1.

The result of this evaluation test on the sealing performance is shown in FIG. 9 and the following table 4.

TABLE 4

| Test example | 41 | 42 | 43 | 44 |
|---|---|---|---|---|
| Gap width a (mm) | 2.1 | 1.6 | 1.1 | 0.6 |
| Dust entry amount (g) | 4.8 | 4.9 | 4.8 | 5.0 |

As shown in FIG. 9 and the table 4, in the test examples 41 to 44, little difference in the dust entry amount is observed. As can be seen from the result of this evaluation test, provided that the shaft diameter d of the boss part 14 is fixed, variations of the gap width a of the gap g1 have little effect on the sealing performance of the sealing structures 1.

Evaluation Test 5: Evaluation of Grain Size of Test Powder

The inventor conducted this evaluation test to evaluate the influence of a difference in grain size between foreign matter on the sealing performance of the sealing structure 1 with a torsional damper and an oil seal described above. In this evaluation test, sealing structures 1 with a torsional damper and an oil seal according to the first embodiment of the present disclosure described above that had different gap angle differences 6 were fabricated (test examples 51 to 60), and the evaluation test on the sealing performance was conducted by separately using two different kinds of test powders: JIS class 1 and JIS class 3. The test examples 51 and 56 were sealing structures 1 with a torsional damper and an oil seal according to the first embodiment of the present disclosure described above that had a diameter-increasing angle α of 0°. The grain size of the test powder of JIS class 1 is equal to or greater than 150 μm, and the amount of the test powder was 5 vol %. The grain size of the test powder of JIS class 3 is 5 to 75 μm, and the amount of the test powder was 5 vol %. The evaluation test was conducted in the same manner as the evaluation test on the sealing structures according to the test examples 1 to 4 described above, using the same test sealing apparatus (see FIGS. 4 and 6) and the same sealing performance tester 70 (see FIGS. 5A and 5B). The inclination angle γ of the side lip 29, the gap width a of the gap g1, the overlap amount b between the side lip 29 and the hub pocket 30, the distance c between the disk part 16 of the damper pulley 10 and the oil seal 20, and the shaft diameter d of the boss part 14 did not differ between the test examples 51 to 60. The overlap amount b was 0, the inclination angle γ of the side lip 29 was 7.2°, and the shaft diameter d was 42 mm.

Specifically, in the test examples 51 and 56, the diameter-increasing angle α of the hub pocket 30 was 0°, and the gap angle difference δ was −7.2°. In the test examples 52 and 57, the diameter-increasing angle α of the hub pocket 30 was 7.2°, and the gap angle difference δ was 0°. In the test examples 53 and 58, the diameter-increasing angle α of the hub pocket 30 was 14.4°, and the gap angle difference δ was 7.2°. In the test examples 54 and 59, the diameter-increasing angle α of the hub pocket 30 was 19.3°, and the gap angle difference δ was 12.1°. In the test examples 55 and 60, the diameter-increasing angle α of the hub pocket 30 was 21.6°, and the gap angle difference δ was 14.4°.

Figure 10:
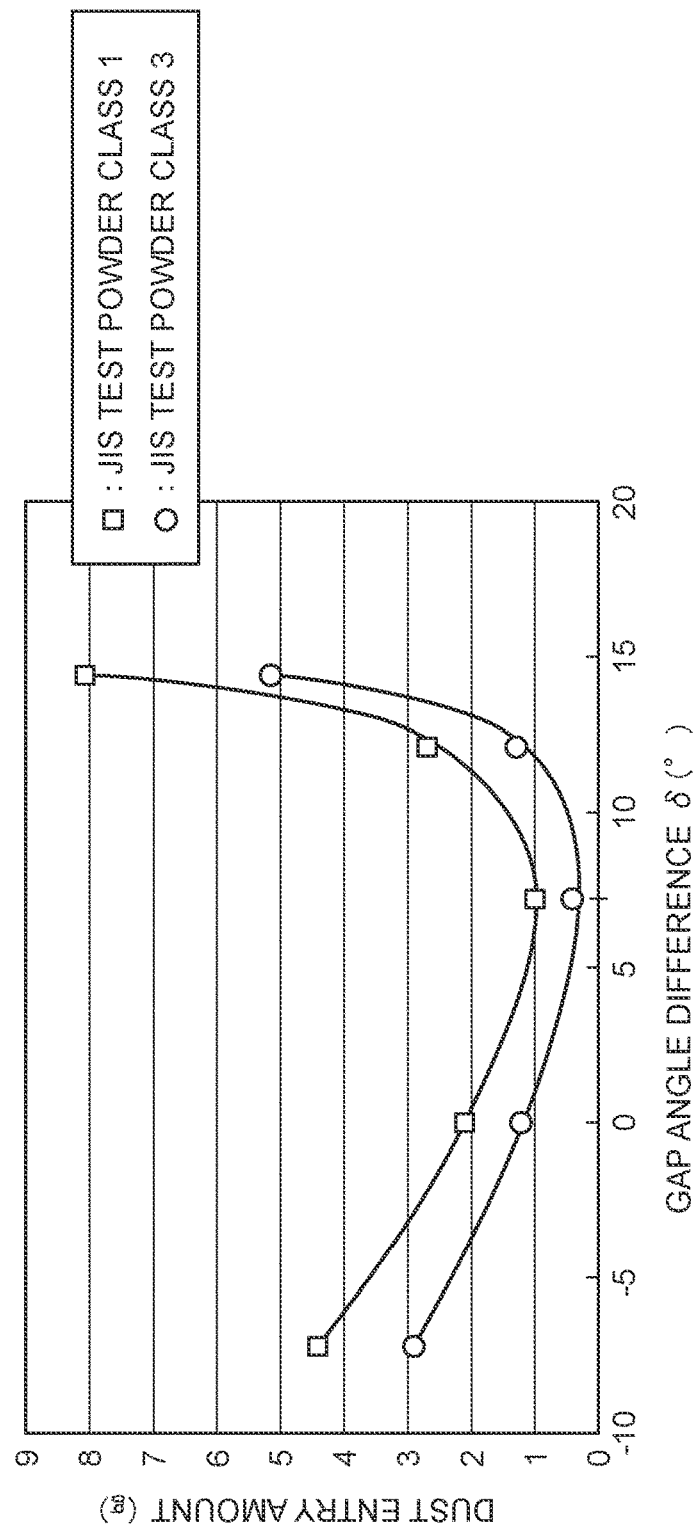
FIG. 10 is a graph showing a relationship between the grain size of a test powder and the dust entry amount of the sealing structure shown in FIG. 1.

The result of this evaluation test on the sealing performance is shown in FIG. 10 and the following table 5.

TABLE 5

| Test example | 51 | 52 | 53 | 54 | 55 | 56 | 57 | 58 | 59 | 60 |
|---|---|---|---|---|---|---|---|---|---|---|
| Diameter-increasing angle α (°) | 0 | 7.2 | 14.4 | 19.3 | 21.6 | 0 | 7.2 | 14.4 | 19.3 | 21.6 |
| Inclination angle γ (°) | 7.2 | 7.2 | 7.2 | 7.2 | 7.2 | 7.2 | 7.2 | 7.2 | 7.2 | 7.2 |
| Gap angle difference δ (°) | −7.2 | 0 | 7.2 | 12.1 | 14.4 | −7.2 | 0 | 7.2 | 12.1 | 14.4 |
| Test powder | JIS class 1 | | | | | JIS class 3 | | | | |
| Dust entry amount (g) | 4.4 | 2.1 | 1.0 | 2.7 | 8.1 | 2.9 | 1.2 | 0.4 | 1.3 | 5.2 |

As shown in FIG. 10 and the table 5, this evaluation test shows that the dust entry amount is smaller when JIS test powder class 3, which has a smaller grain size, is used than when JIS test powder class 1 is used as test powder. However, for both JIS test powder class 1 and JIS test powder class 3 having different grain sizes, it is observed that there is the same correlation as observed in the evaluation test 2 described above between the gap angle difference δ and the dust entry amount. That is, in both the sealing structures for which JIS test powder class 1 and JIS test powder class 3 having different grain sizes are used as the test powder, the dust entry amount tends to be reduced if the gap angle difference δ is equal to or greater than 1.0° and equal to or smaller than 11.0°, further reduced if the gap angle difference δ is equal to or greater than 2.0° and equal to or smaller than 9.0°, and even further reduced if the gap angle difference δ is equal to or greater than 3.0° and equal to or smaller than 8.0°. It is also shown that, in both the sealing structures for which JIS test powder class 1 and JIS test powder class 3 having different grain sizes are used as the test powder, the dust entry amount is most significantly reduced if the gap angle difference δ is 7.2°. This evaluation result shows that, regardless of the size of the foreign matter to which the sealing structure 1 is exposed, the sealing structure 1 can reduce the dust entry amount if the gap angle difference δ falls within the range from 1.0° to 11.0°, more significantly reduce the dust entry amount if the gap angle difference δ falls within the range from 2.0° to 9.0°, and even more significantly reduce the dust entry amount if the gap angle difference δ falls within the range from 3.0° to 8.0°. This result also shows that, regardless of the size of the foreign matter to which the sealing structure 1 is exposed, the sealing structure 1 can most significantly reduce the dust entry amount if the gap angle difference δ is 7.2°.

Next, a sealing structure with a torsional damper and an oil seal according to a second embodiment of the present disclosure will be described. A sealing structure 2 with a torsional damper and an oil seal according to the second embodiment of the present disclosure differs from the sealing structure 1 with a torsional damper and an oil seal according to the first embodiment of the present disclosure described above only in the aspect of the annular gap formed between the side lip 29 and the outer circumferential surface 31 of the hub pocket 30. In the following, only the difference will be described, and the components of the sealing structure 2 with a torsional damper and an oil seal according to the second embodiment of the present disclosure that are the same as or similar to those of the sealing structure 1 according to the first embodiment of the present disclosure described above will be denoted by the same reference numerals and will not be further described.

Figure 11:
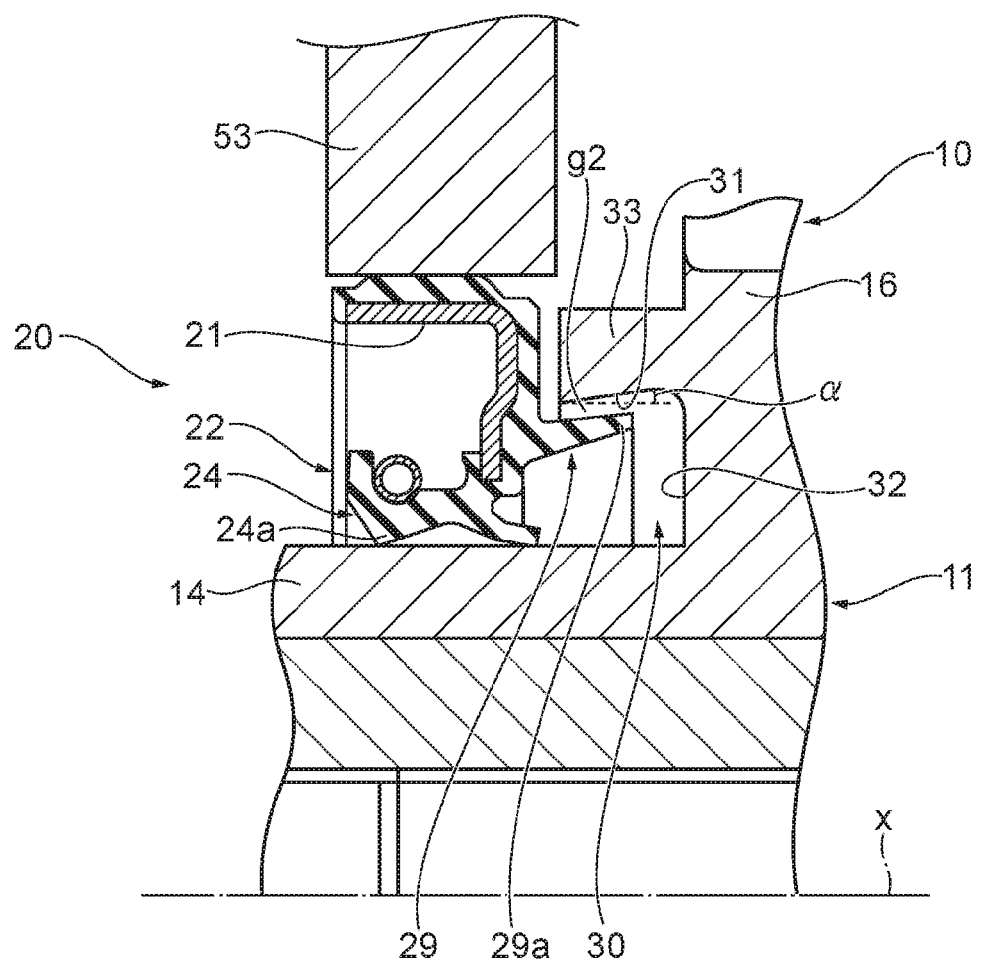
FIG. 11 is a partial enlarged view taken along an axis, showing a schematic configuration of a sealing structure with a torsional damper and an oil seal according to a second embodiment of the present disclosure.

FIG. 11 is a partial enlarged cross-sectional view taken along the axis x, showing a schematic configuration of the sealing structure 2 with a torsional damper and an oil seal according to the second embodiment of the present disclosure.

As shown in FIG. 11, a part of the side lip 29 of the oil seal 20 on the side of the outer end 29a thereof lies in the hub pocket 30, and the side lip 29 and the outer circumferential surface 31 of the hub pocket 30 overlap with each other in the radial direction over the direction of the axis x. That is, the side lip 29 and the outer circumferential surface 31 of the hub pocket 30 are opposed to each other in the radial direction, and an annular gap g2 is formed between the side lip 29 and the outer circumferential surface 31 of the hub pocket 30. That is, the side lip 29 and the outer circumferential surface 31 of the hub pocket 30 overlap with each other.

The annular gap g2 formed by the side lip 29 and the outer circumferential surface 31 of the hub pocket 30 forms a labyrinth seal. Therefore, as with the sealing structure 1 described above, the sealing structure 2 can reduce entry of foreign matter entering from around the damper pulley 10 further toward the seal lip 24 side. Therefore, exposure of the seal lip 24 of the oil seal 20 to foreign matter entering from around the damper pulley 10 can be reduced, damage to or deterioration of the lip tip end part 24a due to the lip tip end part 24a catching foreign matter can be reduced, and thus deterioration of the sealing performance of the oil seal 20 that leads to oil leakage can be reduced.

As described later, the sealing performance of the gap g2 as the labyrinth seal improves as the amount of overlap (overlap) between the side lip 29 and the outer circumferential surface 31 of the hub pocket 30 in the direction of the axis x is wider.

As described above, as with the sealing structure 1 with a torsional damper and an oil seal according to the first embodiment of the present disclosure, the sealing structure 2 with a torsional damper and an oil seal according to the second embodiment of the present disclosure can reduce exposure of the seal lip 24 of the oil seal 20 to foreign matter entering from around the damper pulley 10.

Next, the sealing performance of the sealing structure 2 with a torsional damper and an oil seal according to the second embodiment of the present disclosure will be described.

Evaluation Test 6: Evaluation of Overlap Amount b

The inventor conducted this evaluation test to evaluate the influence of a difference in the overlap amount b, which is the length of overlap between the side lip 29 and the outer circumferential surface 31 of the hub pocket 30 in the direction of the axis x, on the sealing performance of the sealing structure 2 with a torsional damper and an oil seal. In this evaluation test, sealing structures 2 with a torsional damper and an oil seal according to the second embodiment of the present disclosure described above in which different overlap amounts b were set for each of the diameter-increasing angles α of the hub pocket 30 (test examples 61 to 77) were fabricated, and the evaluation test was conducted on the sealing performance of the sealing structures 2. The test examples 72 to 77 were sealing structures with a torsional damper and an oil seal according to the second embodiment of the present disclosure described above that had a diameter-increasing angle α of 10°. The diameter-increasing angle α of the hub pocket 30 was 7.2° in the test examples 61 to 65, and 14.4° in the test examples 66 to 71. The evaluation test was conducted in the same manner as the evaluation test on the sealing structures according to the test examples 1 to 4 described above, using the same test sealing apparatus (see FIGS. 4 and 6) and the same sealing performance tester 70 (see FIGS. 5A and 5B). The inclination angle γ of the side lip 29 and the shaft diameter d of the boss part 14 did not differ between the test examples 61 to 74. The inclination angle γ was 7.2°. In the test examples 61 to 70 and 72 to 76, the overlap amount b was set at the values listed below by displacing the attachment A having the hub pocket 30 (see FIG. 6) in the direction of the axis x. As a result, in the test examples 61 to 70 and 72 to 76, the distance c between the disk part 16 of the damper pulley 10 and the oil seal 20 varied corresponding to the set overlap amount. On the other hand, in the test examples 71 and 77, the value of the distance c was made equal to the value of the distance c in the test examples 61 and 72 (in which the overlap amount b=0) by cutting the outer side surface of the elastic body part 22 of the oil seal 20 opposed to the disk part 16 of the damper pulley 10.

Specifically, the overlap amount b was 0 mm in the test examples 61, 66 and 72, 0.6 mm in the test examples 62, 67, 71, 73 and 77, 1.2 mm in the test examples 63, 68 and 74, 1.8 mm in the test examples 64, 69 and 75, and 2.1 mm in the test examples 65, 70 and 76.

Figure 12:
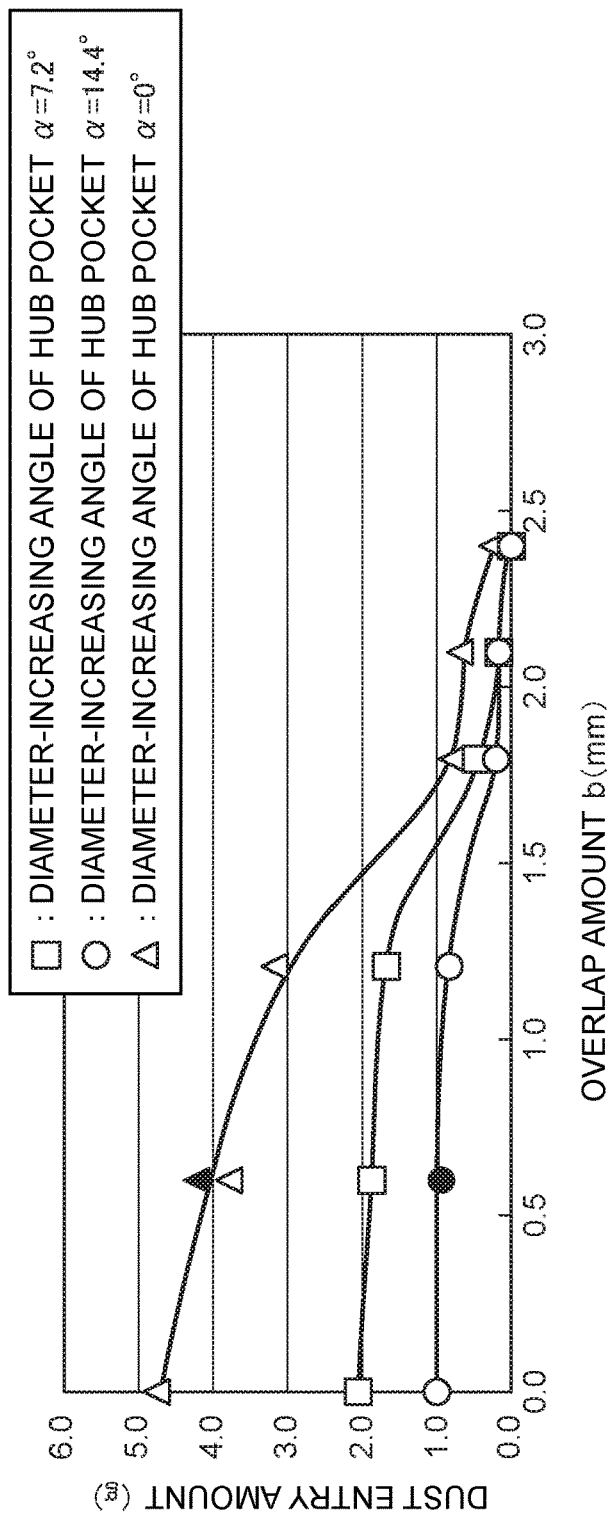
FIG. 12 is a graph showing a relationship between the overlap amount and the dust entry amount of the sealing structure shown in FIG. 11.

The result of this evaluation test on the sealing performance is shown in FIG. 12 and the following table 6.

TABLE 6

| Test example | 61 | 62 | 63 | 64 | 65 | 66 | 67 | 71 | 68 | 69 | 70 | 72 | 73 | 77 | 74 | 75 | 76 |
|---|---|---|---|---|---|---|---|---|---|---|---|---|---|---|---|---|---|
| Diameter-increasing angle α (°) | 7.2 | 7.2 | 7.2 | 7.2 | 7.2 | 14.4 | 14.4 | 14.4 | 14.4 | 14.4 | 14.4 | 0 | 0 | 0 | 0 | 0 | 0 |
| Inclination angle γ (°) | 7.2 | 7.2 | 7.2 | 7.2 | 7.2 | 7.2 | 7.2 | 7.2 | 7.2 | 7.2 | 7.2 | 7.2 | 7.2 | 7.2 | 7.2 | 7.2 | 7.2 |
| Overlap amount b (mm) | 0 | 0.6 | 1.2 | 1.8 | 2.1 | 0 | 0.6 | 0.6 | 1.2 | 1.8 | 2.1 | 0 | 0.6 | 0.6 | 1.2 | 1.8 | 2.1 |
| Distance c (mm) | 3.2 | 2.6 | 2.0 | 1.4 | 1.1 | 3.2 | 2.6 | 3.2 | 2.0 | 1.4 | 1.1 | 3.2 | 2.6 | 3.2 | 2.0 | 1.4 | 1.1 |
| Dust entry amount (g) | 2.05 | 1.80 | 1.65 | 0.50 | 0.25 | 1.00 | 0.90 | 0.95 | 0.85 | 0.25 | 0.20 | 4.80 | 3.80 | 4.25 | 3.20 | 0.80 | 0.70 |

As shown in FIG. 12 and the table 6, this evaluation test shows that there is an association between the overlap amount b and the dust entry amount. More specifically, the evaluation test shows that, in a similar way in each of the diameter-increasing angles α, the dust entry amount decreases as the overlap amount b increases. The darkened circle and the darkened triangle in FIG. 12 correspond to the test results of the test examples 71 and 77, respectively, and the test results of the test examples 71 and 77 are substantially equivalent to those of the test examples 67 and 73, respectively, which have the same overlap amount b (b=0.6 mm) as in the test examples 71 and 77 and have a distance c reduced in accordance with the value of the overlap amount b. Thus, in this evaluation test, it can be considered that the distance c between the disk part 16 of the damper pulley 10 and the oil seal 20 has no effect on the dust entry amount.

As can be seen from the above description, the sealing structure 2 with a torsional damper and an oil seal according to the second embodiment of the present disclosure can more significantly reduce the amount of dust entering through the gap g2 and can be improved in the sealing performance as the overlap amount b increases. Specifically, with the sealing structure 2 according to this embodiment, the overlap amount b can be increased by increasing the length of the side lip 29 in the extending direction. However, the side lip 29, which is made of an elastic material such as an elastic rubber material, vertically bends under its own weight as the length in the extending direction increases. Thus, although the overlap amount b is preferably as large as possible, an upper limit value of the overlap amount b is set within a range in which the side lip 29 can maintain a desired shape under the force of gravity or other forces exerted thereon during use, for example. As can be seen from FIG. 12 and the table 6, in the sealing structures with each of the different diameter-increasing angles α, the dust entry amount is markedly reduced if the overlap amount b is increased from 1.2 mm to 1.8 mm, and a lower limit value of the overlap amount b is preferably between 1.2 mm and 1.8 mm or is 1.8 mm.

Next, a sealing structure with a torsional damper and an oil seal according to a third embodiment of the present disclosure will be described. A sealing structure 3 with a torsional damper and an oil seal according to the third embodiment of the present disclosure differs from the sealing structure 1 with a torsional damper and an oil seal according to the first embodiment of the present disclosure described above in the structure forming the hub pocket 30. In the following, only the difference will be described, and the components of the sealing structure 3 with a torsional damper and an oil seal according to the third embodiment of the present disclosure that are the same as or similar to those of the sealing structure 1 according to the first embodiment of the present disclosure described above will be denoted by the same reference numerals and will not be further described.

Figure 13:
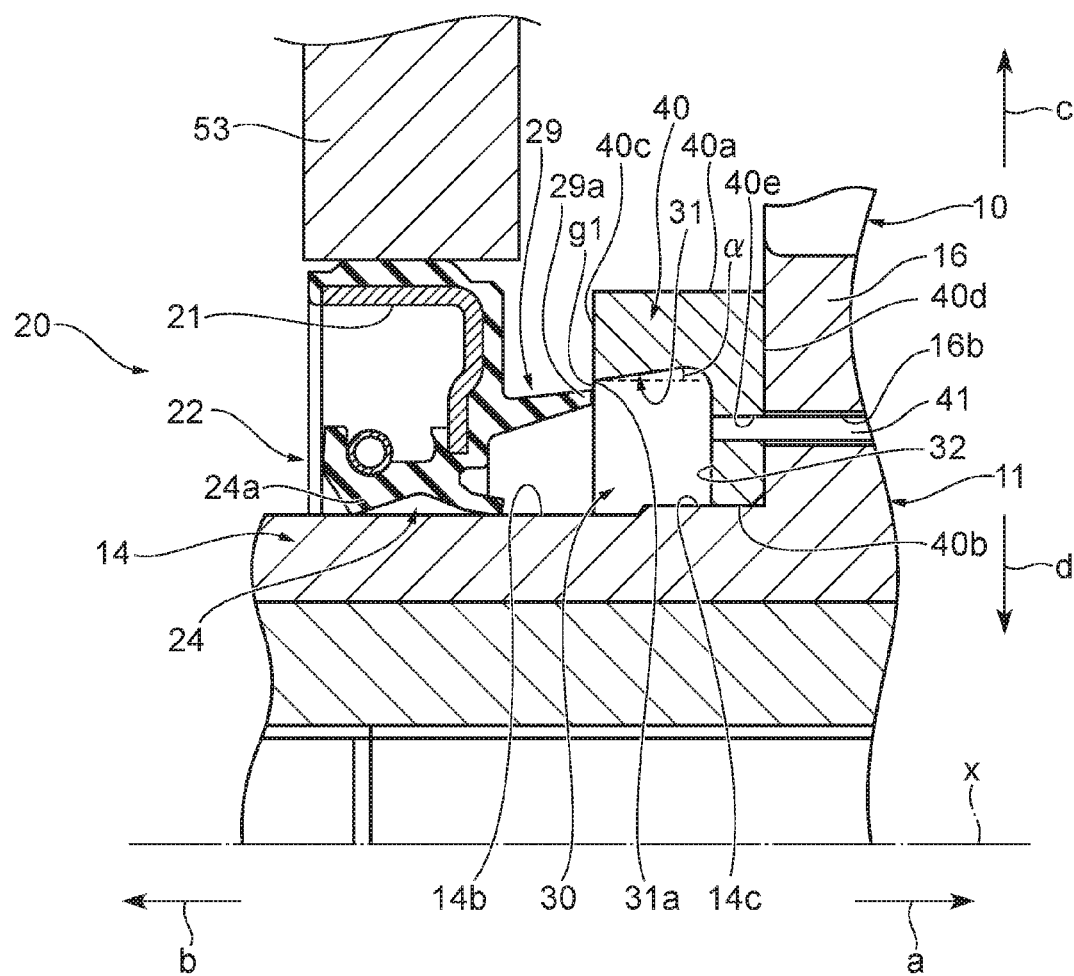
FIG. 13 is a partial enlarged cross-sectional view taken along an axis, showing a schematic configuration of a sealing structure with a torsional damper and an oil seal according to a third embodiment of the present disclosure.

FIG. 13 is a partial enlarged cross-sectional view taken along the axis x, showing a schematic configuration of the sealing structure 3 with a torsional damper and an oil seal according to the third embodiment of the present disclosure. As shown in FIG. 13, in the damper pulley 10 of the sealing structure 3 with a torsional damper and an oil seal, the outer circumferential surface 31 and the bottom surface 32 of the hub pocket 30 are not formed in the hub 11. The sealing structure 3 with a torsional damper and an oil seal has an attachment annular member 40 that is separate from the hub 11 and attached to the damper pulley 10, and the outer circumferential surface 31 and the bottom surface 32 of the hub pocket 30 are formed in the attachment annular member 40.

The attachment annular member 40 is a disk-shaped hollow annular member centered about the axis x. The attachment annular member 40 is shaped to be fitted around the boss part 14 of the damper pulley 10, and a recess is formed in one side surface of the attachment annular member 40 to provide the outer circumferential surface 31 and the bottom surface 32 of the hub pocket 30. More specifically, as shown in FIG. 13, the attachment annular member 40 has an outer circumferential surface 40a, which is an outer periphery side surface, and an inner circumferential surface 40b, which is an inner periphery side surface defining a through-hole in which the boss part 14 of the damper pulley 10 is inserted (fitted). A recess that is recessed in the outer side direction is formed in a side surface 40c of the attachment annular member 40, which is a side surface thereof facing the inner side, to provide the outer circumferential surface 31 and the bottom surface 32 of the hub pocket 30.

The boss part 14 of the damper pulley 10 has a step surface 14c, which is connected to the outer circumferential surface 14b on the outer side. The step surface 14c has a larger diameter than the outer circumferential surface 14b and protrudes beyond the outer circumferential surface 14b outward. The outer circumferential surface 14b and the step surface 14c are smoothly connected to each other. The attachment annular member 40 is attached to the boss part 14b with the inner circumferential surface 40b fitted into the step surface 14c of the boss part 14.

The attachment annular member 40 is attached to the damper pulley 10 by a fixing member 41 in such a manner that the attachment annular member 40 cannot relatively move with respect to the damper pulley 10. In the state in which the attachment annular member 40 is attached, a side surface 40d, which is a side surface of the attachment annular member 40 facing the outer side, is in contact with a side surface of the disk part 16. The fixing member 41 is a bolt, a rivet or a pin, for example, and fixes the attachment annular member 40 to the damper pulley 10 by being engaged with a through-hole 16b, which is a through-hole formed in the disk part 16 to extend in the direction of the axis x, and a through-hole 40e that is formed in the attachment annular member 40 to extend in the direction of the axis x between the bottom surface 32 and the side surface 40d. For example, one or both of the through-holes 16b and 40e is threaded, and the attachment annular member 40 is fixed to the damper pulley 10 by screwing a bolt serving as the fixing member 41 into the threaded hole. If the fixing member 41 is a pin or a rivet, the attachment annular member 40 is fixed to the damper pulley 10 by fitting the fixing member 41 into the through-hole 16b or 40e or engaging the fixing member 41 with the through-hole 16b or 40e. The method of fixing the attachment annular member 40 is not limited to the method described above, and any fixing member 41 that can achieve another known applicable fixing method can be used. The attachment annular member 40 is fixed to the damper pulley 10 with the fixing member 41, therefore the attachment annular member 40 is firmly fixed to the damper pulley 10.

In the state in which the attachment annular member 40 is attached to the damper pulley 10, the annular gap g1 is formed between the outer end 29a of the side lip 29 of the oil seal 20 and the inner end 31a of the outer circumferential surface 31 of the hub pocket 30, as with the sealing structure 1 with a torsional damper and an oil seal described above.

The material of the attachment annular member 40 may be a metal material or a resin material, for example, stainless steel or ABS resin. The resin material of the attachment annular member 40 is preferably a resin that can resist the ambient temperature of the use environment, such as an engine room.

The sealing structure 3 with a torsional damper and an oil seal according to the third embodiment of the present disclosure described above can achieve the same effects and advantages as the sealing structure 1 with a torsional damper and an oil seal according to the first embodiment of the present disclosure, and can reduce exposure of the seal lip 24 of the oil seal 20 to foreign matter entering from around the damper pulley 10.

With the sealing structure 3 with a torsional damper and an oil seal according to the third embodiment of the present disclosure, the outer circumferential surface 31 and the bottom surface 32 of the hub pocket 30 are formed in the attachment annular member 40, and therefore, the hub pocket 30 can be easily machined. With the sealing structures 1 and 2 with a torsional damper and an oil seal described earlier, the hub pocket 30 is formed in the hub 11 by cutting the hub 11 formed by casting. The hub 11 has a heavy weight, and the hub pocket 30 needs to be machined while avoiding interference between a cutting tool and the boss part 14. Thus, with the sealing structures 1 and 2 having a torsional damper and an oil seal, it is difficult to machine the hub pocket 30. To the contrary, with the sealing structure 3 with a torsional damper and an oil seal, the outer circumferential surface 31 and the bottom surface 32 of the hub pocket 30 are formed in an annular member separate from the hub 11 to provide the attachment annular member 40, and the attachment annular member 40 is attached to the damper pulley 10 to provide the hub pocket 30. Thus, the hub pocket 30 can be easily formed. In particular, the inclined outer circumferential surface 31 of the hub pocket 30 can be easily formed.

With the sealing structure 3 with a torsional damper and an oil seal according to the third embodiment of the present disclosure, the boss part 14 of the damper pulley 10 has the step surface 14c protruding in the outer periphery side direction beyond the outer circumferential surface 14b outward, and the attachment annular member 40 is fitted on the step surface 14c. As a result, when the attachment annular member 40 is fitted to the boss part 14, the outer circumferential surface 14b, which serves as a lip sliding surface with which the lip tip end part 24a of the seal lip 24 comes into contact, can be prevented from being damaged.

Next, a sealing structure with a torsional damper and an oil seal according to a fourth embodiment of the present disclosure will be described. A sealing structure 4 with a torsional damper and an oil seal according to the fourth embodiment of the present disclosure differs from the sealing structure 3 with a torsional damper and an oil seal according to the third embodiment of the present disclosure described above only in the shape of the annular gap formed by the side lip 29 and the outer circumferential surface 31 of the hub pocket 30. In addition, the sealing structure 4 with a torsional damper and an oil seal according to the fourth embodiment of the present disclosure differs from the sealing structure 2 with a torsional damper and an oil seal according to the second embodiment of the present disclosure described above in the structure forming the hub pocket 30, and the sealing structure 4 has the attachment annular member 40. In the following, only the differences will be described, and the components of the sealing structure 4 with a torsional damper and an oil seal according to the fourth embodiment of the present disclosure that are the same as or similar to those of the sealing structures 2 and 3 according to the second and third embodiments of the present disclosure described above will be denoted by the same reference numerals and will not be further described.

Figure 14:
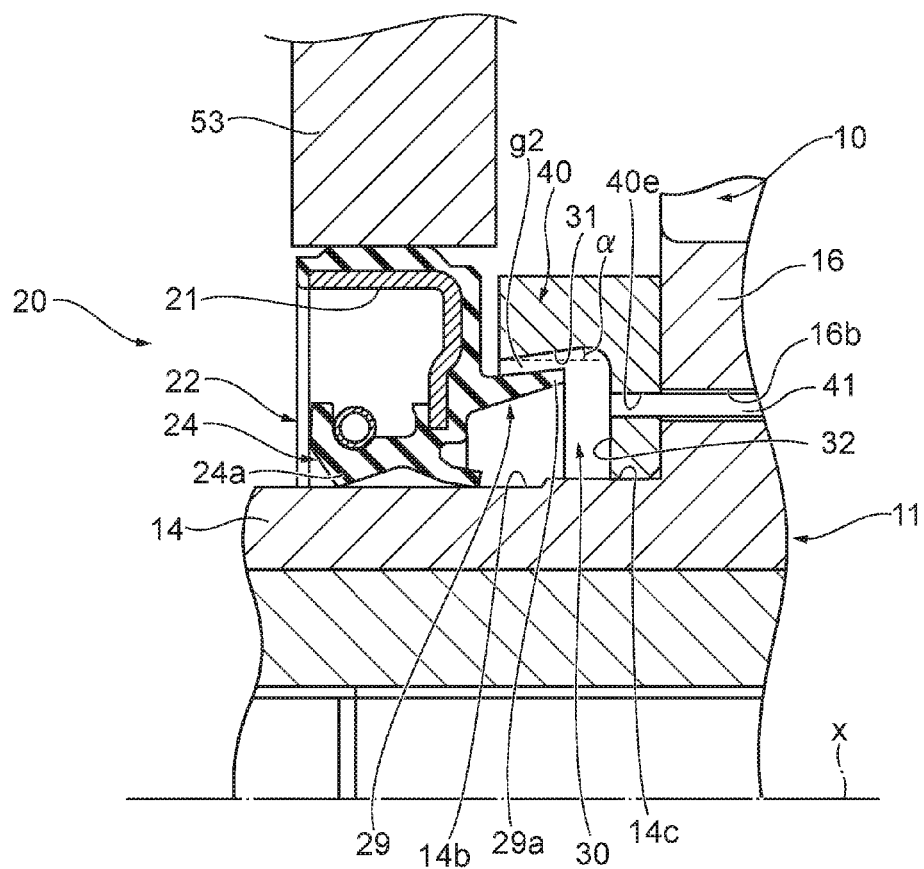
FIG. 14 is a partial enlarged cross-sectional view taken along an axis, showing a schematic configuration of a sealing structure with a torsional damper and an oil seal according to a fourth embodiment of the present disclosure.

FIG. 14 is a partial enlarged cross-sectional view taken along the axis x, showing a schematic configuration of the sealing structure 4 with a torsional damper and an oil seal according to the fourth embodiment of the present disclosure. As shown in FIG. 14, in the sealing structure 4 with a torsional damper and an oil seal, as with the sealing structure 2 with a torsional damper and an oil seal according to the second embodiment of the present disclosure, a part of the side lip 29 of the oil seal 20 on the side of the outer end 29a thereof lies in the hub pocket 30, and the side lip 29 and the outer circumferential surface 31 of the hub pocket 30 overlaps with each other over the direction of the axis x in the radial direction (to overlap). That is, the side lip 29 and the outer circumferential surface 31 of the hub pocket 30 are opposed to each other in the radial direction, and an annular gap g2 is formed between the side lip 29 and the outer circumferential surface 31 of the hub pocket 30 to form a labyrinth seal. With the sealing structure 4 with a torsional damper and an oil seal, the outer circumferential surface 31 of the attachment annular member 40 is elongated toward the inner side so that the side lip 29 and the outer circumferential surface 31 of the hub pocket 30 overlap with each other. Alternatively, the attachment annular member 40 may be attached at an inner side position more than the attachment annular member 40 of the sealing structure 3 with a torsional damper and an oil seal according to the third embodiment of the present disclosure. Alternatively, the side lip 29 may be elongated toward the outer side.

The sealing structure 4 with a torsional damper and an oil seal according to the fourth embodiment of the present disclosure having the configuration described above can achieve the same effects and advantages as the sealing structures 2 and 3 with a torsional damper and an oil seal according to the second and third embodiments of the present disclosure.

As can be seen from the above description, as with the sealing structures 2 and 3 with a torsional damper and an oil seal according to the second and third embodiments of the present disclosure, the sealing structure 4 with a torsional damper and an oil seal according to the fourth embodiment of the present disclosure can reduce exposure of the seal lip 24 of the oil seal 20 to foreign matter entering from around the damper pulley 10.

Next, a variation of the attachment annular member 40 of the sealing structures 3 and 4 with a torsional damper and an oil seal according to the third and fourth embodiments of the present disclosure described above will be described below.

Figure 15:
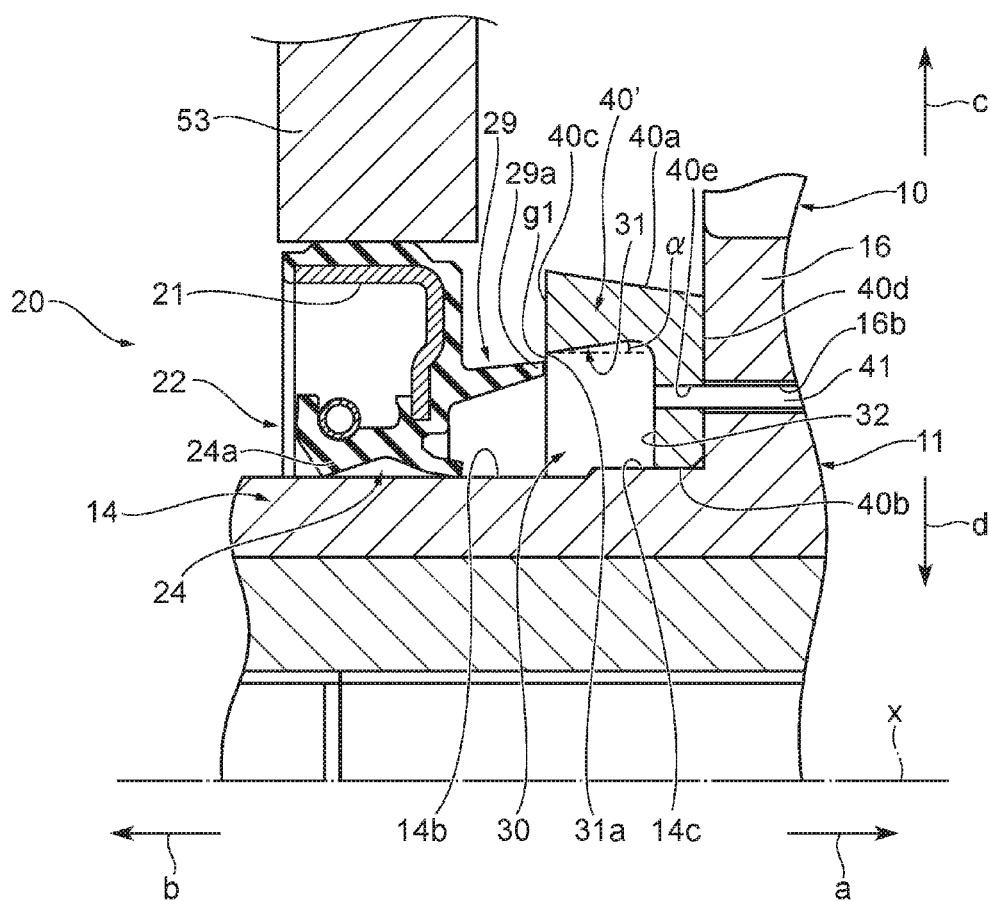
FIG. 15 is a cross-sectional view showing a schematic configuration of a first variation of an attachment annular member of the sealing structures with a torsional damper and an oil seal according to the third and fourth embodiments of the present disclosure.

FIG. 15 is a cross-sectional view showing a schematic configuration of a first variation of the attachment annular member 40 of the sealing structures 3 and 4 with a torsional damper and an oil seal according to the third and fourth embodiments of the present disclosure. The outer circumferential surface 40a of an attachment annular member 40' according to the first variation is an annular surface that diverges toward the outer periphery side, toward the inner side in the direction of the axis x, such as a tapered surface in a conical surface shape. Thus, foreign matter that enters from around the damper pulley 10 can be accumulated on the outer circumferential surface 40a of the attachment annular member 40' and prevented from reaching the oil seal 20. The foreign matter accumulated on the outer circumferential surface 40a of the attachment annular member 40' can be discharged downwardly under its own weight or by rotation of the damper pulley 10. Although FIG. 15 shows the attachment annular member 40' according to the first variation attached to the sealing structure 3 with a torsional damper and an oil seal, the attachment annular member 40' according to the first variation can also be used with the sealing structure 4 with a torsional damper and an oil seal, as with the attachment annular member 40. Any sealing structure with the attachment annular member 40' according to this variation can achieve the same effects as the sealing structures 3 and 4 with a torsional damper and an oil seal according to the third and fourth embodiments of the present disclosure described above.

Next, a sealing structure with a torsional damper and an oil seal according to a fifth embodiment of the present disclosure will be described. A sealing structure 5 with a torsional damper and an oil seal according to the fifth embodiment of the present disclosure differs from the sealing structure 1 with a torsional damper and an oil seal according to the first embodiment of the present disclosure described above in the structure forming the hub pocket 30. In the following, only the difference will be described, and the components of the sealing structure 5 with a torsional damper and an oil seal according to the fifth embodiment of the present disclosure that are the same as or similar to those of the sealing structure 1 according to the first embodiment of the present disclosure described above will be denoted by the same reference numerals and will not be further described.

Figure 16:
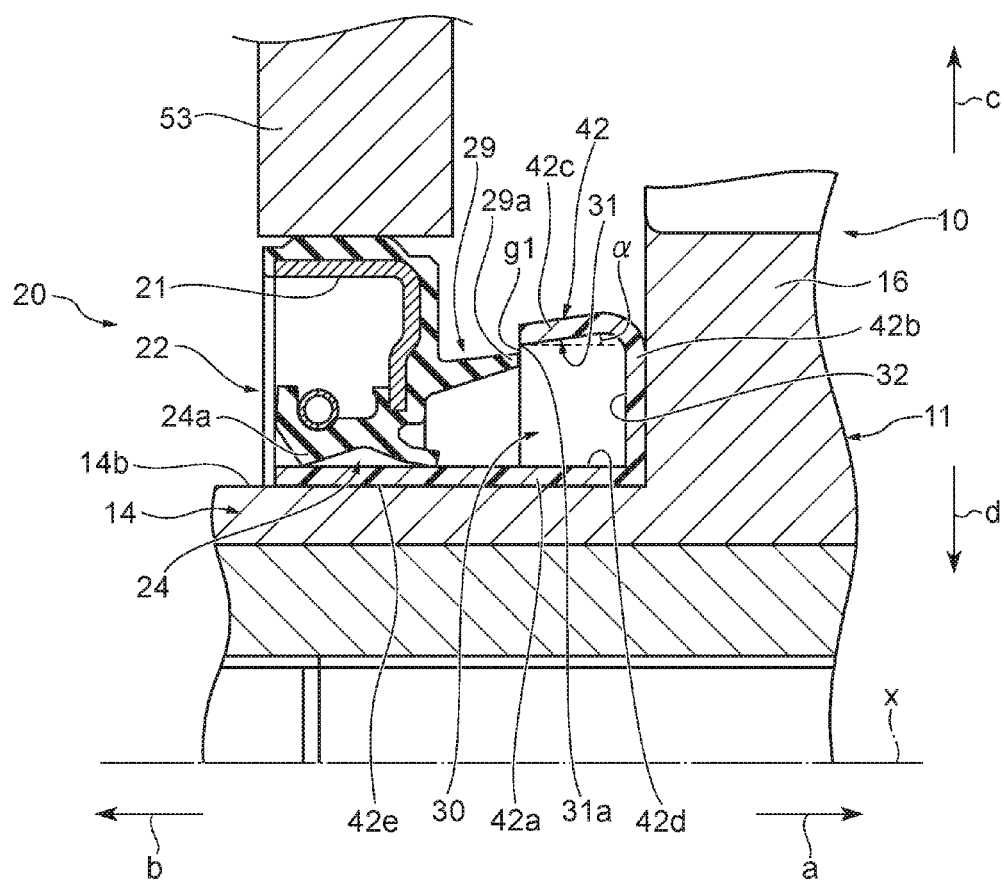
FIG. 16 is a partial enlarged cross-sectional view taken along an axis, showing a schematic configuration of a sealing structure with a torsional damper and an oil seal according to a fifth embodiment of the present disclosure.

FIG. 16 is a partial enlarged cross-sectional view taken along the axis x, showing a schematic configuration of the sealing structure 5 with a torsional damper and an oil seal according to the fifth embodiment of the present disclosure. As shown in FIG. 16, in the damper pulley 10 of the sealing structure 5 with a torsional damper and an oil seal, the hub pocket 30 is not formed in the hub 11. The sealing structure 5 with a torsional damper and an oil seal has an attachment annular member 42 that is separate from the hub 11 and is attached to the damper pulley 10, and the hub pocket 30 is formed in the attachment annular member 42.

The attachment annular member 42 is a disk-shaped hollow annular member centered about the axis x. The attachment annular member 42 is shaped to be fitted around the boss part 14 of the damper pulley 10, and a recess is formed in one side surface of the attachment annular member 42 to provide the hub pocket 30. More specifically, as shown in FIG. 16, the attachment annular member 42 has a cylindrical part 42a that is a cylindrical part centered about the axis x, a disk part 42b that is a disk-shaped part that extends toward the outer periphery side in the radial direction from an outer side end of the cylindrical part 42a, and an outer circumferential part 42c that is a part that extends toward the inner side from an outer periphery side end of the disk part 42b. The attachment annular member 42 is made of a metal material and is formed from a single metal member, such as a metal plate, by press working or the like. The cylindrical part 42a, the disk part 42b and the outer circumferential part 42 are integrally made from the same material, and have the same or substantially the same thickness. The metal material forming the attachment annular member 42 is stainless steel or SPCC (cold rolled steel sheet), for example.

As shown in FIG. 16, the cylindrical part 42a, the disk part 42b and the outer circumferential part 42c of the attachment annular member 42 define a space to provide the hub pocket 30. More specifically, a inner periphery side surface of the outer circumferential part 42c forms the outer circumferential surface 31 of the hub pocket 30, and the outer circumferential part 42c is inclined at the same angle (inclination angle α) with the outer circumferential surface 31 of the hub pocket 30 with respect to the axis x. An inner side surface of the disk part 42b forms the bottom surface 32 of the hub pocket 30, and an outer circumferential surface 42d, which is an outer periphery side surface of the cylindrical part 42a, forms an inner periphery side surface of the hub pocket 30 opposed to the outer circumferential surface 31.

The cylindrical part 42a of the attachment annular member 42 is shaped to be fitted around the boss part 14 of the damper pulley 10. In the state in which the attachment annular member 42 is attached to the boss part 14, an inner circumferential surface 42e, which is an inner periphery side surface of the cylindrical part 42a, is in intimate contact with the outer circumferential surface 14b of the boss part 14. The attachment annular member 42 is attached to the hub 11 of the damper pulley 10 with the cylindrical part 42a fitted around the boss part 14 in such a manner that the attachment annular member 42 cannot relatively move with respect to the hub 11 of the damper pulley 10. In this state, the disk part 42b of the attachment annular member 42 may abut against the disk part 16 of the hub 11 or may be at a predetermined distance from the disk part 16 of the hub 11.

As shown in FIG. 16, the cylindrical part 42a of the attachment annular member 42 extends to the lip tip end part 24a of the oil seal 20 or beyond the lip tip end part 24a toward the inner side, and the outer circumferential surface 42d of the cylindrical part 42a is in slidable contact with the lip tip end part 24a. In this embodiment, unlike the embodiments described above, the outer circumferential surface 42d of the cylindrical part 42a of the attachment annular member 42 serves as the lip sliding surface for the oil seal 20, instead of the outer circumferential surface 14b of the boss part 14. To this end, the outer circumferential surface 42d of the cylindrical part 42a is polished, coated or otherwise treated. In this embodiment, a treatment (machining or the like) to make the outer circumferential surface 14b of the boss part 14 suitable for the lip sliding surface can be omitted.

In the state in which the attachment annular member 42 is attached to the damper pulley 10, the annular gap g1 is formed between the outer end 29a of the side lip 29 of the oil seal 20 and the inner end 31a of the outer circumferential surface 31 of the hub pocket 30, as with the sealing structure 1 with a torsional damper and an oil seal described above.

The sealing structure 5 with a torsional damper and an oil seal according to the fifth embodiment of the present disclosure described above can achieve the same effects and advantages as the sealing structure 1 with a torsional damper and an oil seal according to the first embodiment of the present disclosure, and can reduce exposure of the seal lip 24 of the oil seal 20 to foreign matter entering from around the damper pulley 10.

With the sealing structure 5 with a torsional damper and an oil seal according to the fifth embodiment of the present disclosure, since the hub pocket 30 is formed in the attachment annular member 42, the hub pocket 30 can be easily machined, as with the sealing structure 3 with a torsional damper and an oil seal according to the third embodiment of the present disclosure described above.

Next, a sealing structure with a torsional damper and an oil seal according to a sixth embodiment of the present disclosure will be described. A sealing structure 6 with a torsional damper and an oil seal according to the sixth embodiment of the present disclosure differs from the sealing structure 5 with a torsional damper and an oil seal according to the fifth embodiment of the present disclosure described above only in the aspect of the annular gap formed between the side lip 29 and the outer circumferential surface 31 of the hub pocket 30. In addition, the sealing structure 6 with a torsional damper and an oil seal according to the sixth embodiment of the present disclosure differs from the sealing structure 2 with a torsional damper and an oil seal according to the second embodiment of the present disclosure described above in the structure of forming the hub pocket 30, and the sealing structure 6 has the attachment annular member 42. In the following, only the differences will be described, and the components of the sealing structure 6 with a torsional damper and an oil seal according to the sixth embodiment of the present disclosure that are the same as or similar to those of the sealing structures 2 and 5 according to the second and fifth embodiments of the present disclosure described above will be denoted by the same reference numerals and will not be further described.

Figure 17:
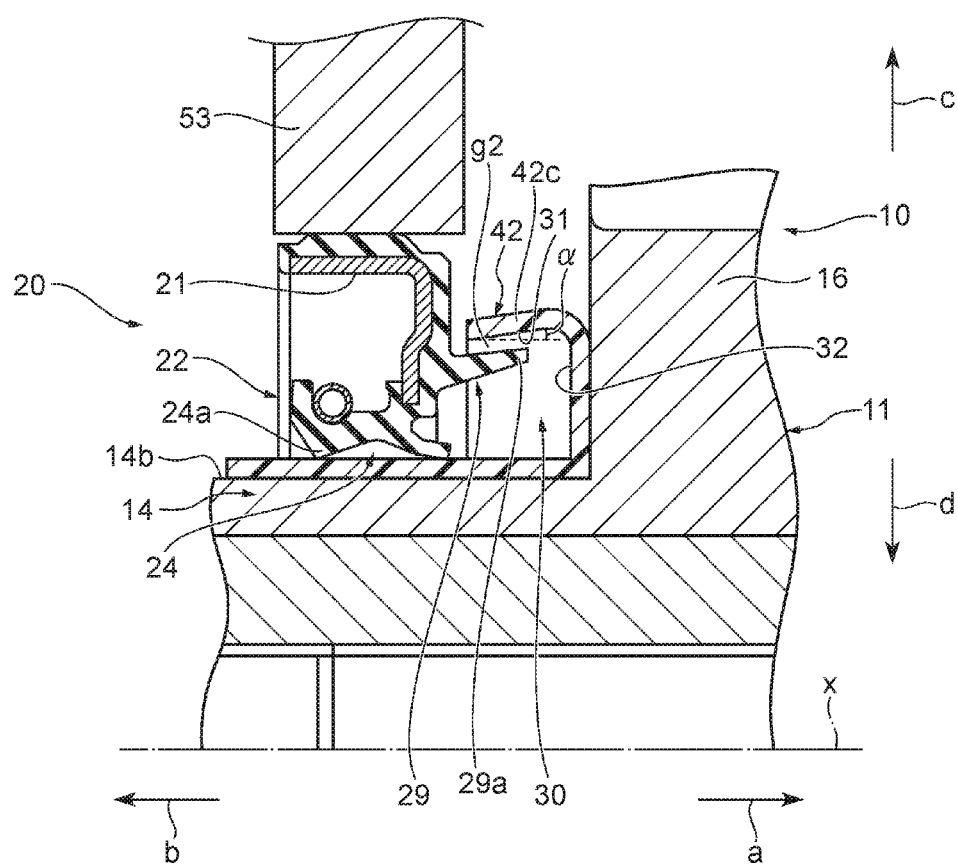
FIG. 17 is a partial enlarged cross-sectional view taken along an axis, showing a schematic configuration of a sealing structure with a torsional damper and an oil seal according to a sixth embodiment of the present disclosure.

FIG. 17 is a partial enlarged cross-sectional view taken along the axis x, showing a schematic configuration of the sealing structure 6 with a torsional damper and an oil seal according to the sixth embodiment of the present disclosure. As shown in FIG. 17, in the sealing structure 6 with a torsional damper and an oil seal, as with the sealing structure 2 with a torsional damper and an oil seal according to the second embodiment of the present disclosure, a part of the side lip 29 of the oil seal 20 on the side of the outer end 29*a* thereof lies in the hub pocket 30, and the side lip 29 and the outer circumferential surface 31 of the hub pocket 30 overlap with each other over the direction of the axis x in the radial direction (to overlap). That is, the side lip 29 and the outer circumferential surface 31 of the hub pocket 30 are opposed to each other in the radial direction, and an annular gap g2 is formed between the side lip 29 and the outer circumferential surface 31 of the hub pocket 30 to form a labyrinth seal. With the sealing structure 6 with a torsional damper and an oil seal, the outer circumferential part 42*c* of the attachment annular member 42 is elongated toward the inner side so that the side lip 29 and the outer circumferential surface 31 of the hub pocket 30 overlap with each other. Alternatively, the attachment annular member 42 may be attached at an inner side position further than the attachment annular member 42 of the sealing structure 5 with a torsional damper and an oil seal according to the fifth embodiment of the present disclosure. Alternatively, the side lip 29 may be elongated toward the outer side.

The sealing structure 6 with a torsional damper and an oil seal according to the sixth embodiment of the present disclosure having the configuration described above can achieve the same effects and advantages as the sealing structures 2 and 5 with a torsional damper and an oil seal according to the second and fifth embodiments of the present disclosure.

As can be seen from the above description, as with the sealing structures 2 and 5 with a torsional damper and an oil seal according to the second and fifth embodiments of the present disclosure, the sealing structure 6 with a torsional damper and an oil seal according to the sixth embodiment of the present disclosure can reduce exposure of the seal lip 24 of the oil seal 20 to foreign matter entering from around the damper pulley 10.

Next, variations of the attachment annular member 42 of the sealing structures 5 and 6 with a torsional damper and an oil seal according to the fifth and sixth embodiments of the present disclosure described above will be described below.

Figure 18:
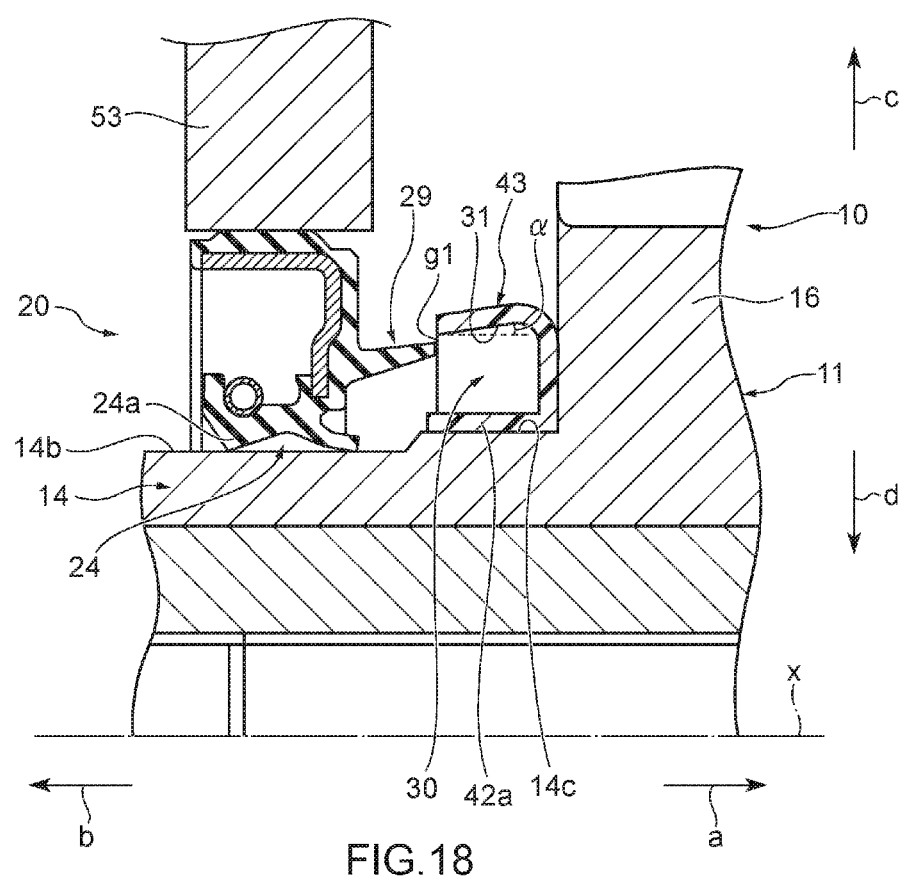
FIG. 18 is a cross-sectional view showing a schematic configuration of a first variation of an attachment annular member of the sealing structures with a torsional damper and an oil seal according to the fifth and sixth embodiments of the present disclosure.

FIG. 18 is a cross-sectional view showing a schematic configuration of a first variation of the attachment annular member 42 of the sealing structures 5 and 6 with a torsional damper and an oil seal according to the fifth and sixth embodiments of the present disclosure. As shown in FIG. 18, an attachment annular member 43 according to the first variation differs from the attachment annular member 42 in that the cylindrical part 42*a* has a shorter length, and the outer circumferential surface of the cylindrical part 42*a* does not serve as the lip sliding surface. Thus, when the attachment annular member 43 according to this variation is used, the outer circumferential surface 14*b* of the boss part 14 of the damper pulley 10 serves as the lip sliding surface, and a treatment (machining or the like) to make the outer circumferential surface 14*b* suitable for the lip sliding surface cannot be omitted.

When the attachment annular member 43 according to this variation is used, as shown in FIG. 18, the boss part 14 of the damper pulley 10 preferably has the step surface 14*c*, which is an outer circumferential surface connected to the outer circumferential surface 14*b* on the outer side of the outer circumferential surface 14*b*. The step surface 14*c* has a larger diameter than the outer circumferential surface 14*b* and protrudes beyond the outer circumferential surface 14*b* outward. The attachment annular member 42 is fixed to the boss part 14 by fitting the cylindrical part 42*a* around the step surface 14*c* of the boss part 14. As a result, when the attachment annular member 43 is fitted to the boss part 14, the outer circumferential surface 14*b*, which serves as a lip sliding surface with which the lip tip end part 24*a* of the seal lip 24 comes into contact, can be prevented from being damaged. Although FIG. 18 shows the attachment annular member 43 according to the first variation attached to the sealing structure 5 with a torsional damper and an oil seal, the attachment annular member 43 according to the first variation can also be used with the sealing structure 6 with a torsional damper and an oil seal, as with the attachment annular member 42. In this case also, the boss part 14 of the damper pulley 10 preferably has the step surface 14*c* that is the outer circumferential surface connected to the outer circumferential surface 14*b* on the outer side of the outer circumferential surface 14*b*. Any sealing structure with the attachment annular member 43 according to this variation can achieve the same effects as the sealing structures 5 and 6 with a torsional damper and an oil seal according to the fifth and sixth embodiments of the present disclosure described above.

Figure 19:
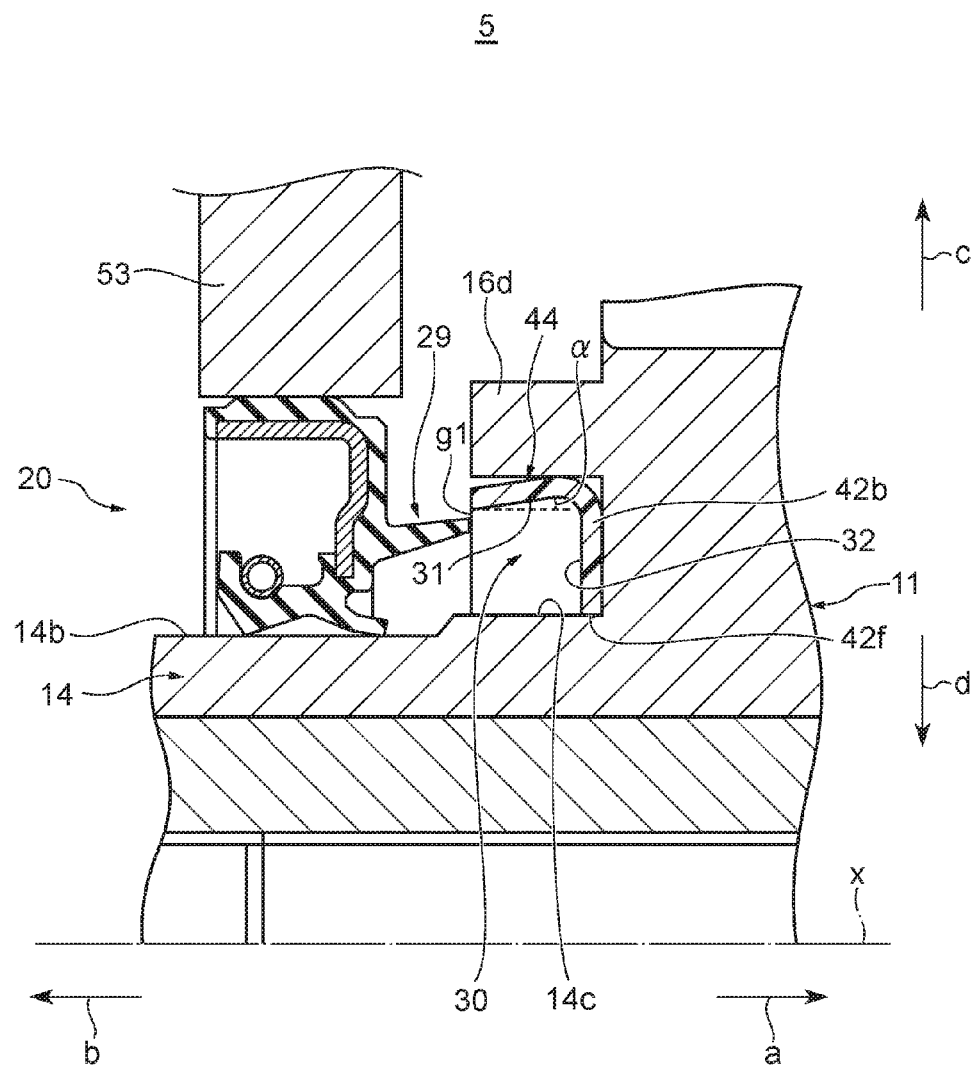
FIG. 19 is a cross-sectional view showing a schematic configuration of a second variation of an attachment annular member of the sealing structures with a torsional damper and an oil seal according to the fifth and sixth embodiments of the present disclosure.

FIG. 19 is a cross-sectional view showing a schematic configuration of a second variation of the attachment annular member 42 of the sealing structures 5 and 6 with a torsional damper and an oil seal according to the fifth and sixth embodiments of the present disclosure. As shown in FIG. 19, an attachment annular member 44 according to the second variation differs from the attachment annular member 42 in that the attachment annular member 44 has no cylindrical part 42*a*, and the attachment annular member 44 does not provide a lip sliding surface. Therefore, when the attachment annular member 44 according to this variation is used, as when the attachment annular member 43 is used, the outer circumferential surface 14*b* of the boss part 14 of the damper pulley 10 serves as a lip sliding surface, and a treatment (machining or the like) to make the outer circumferential surface 14*b* suitable for the lip sliding surface cannot be omitted. The attachment annular member 44 is fixed to the hub 11 by fitting an inner circumferential end 42*f*, which is an inner periphery side end of the disk part 42*b*, around the boss part 14.

When the attachment annular member 44 according to this variation is used, as shown in FIG. 19, the boss part 14 of the damper pulley 10 preferably has the step surface 14*c*, which is an outer circumferential surface connected to the outer circumferential surface 14*b* on the outer side of the outer circumferential surface 14*b*. The step surface 14*c* has a larger diameter than the outer circumferential surface 14*b* and protrudes beyond the outer circumferential surface 14*b* outward. The attachment annular member 44 is fixed to the boss part 14 by fitting the inner circumferential end 42*f* of the disk part 42*b* around the step surface 14*c* of the boss part 14. As a result, when the attachment annular member 44 is fitted to the boss part 14, the outer circumferential surface 14*b*, which serves as a lip sliding surface with which the lip tip end part 24*a* of the seal lip 24 comes into contact, can be prevented from being damaged. When the attachment annular member 44 according to this variation is used, as shown in FIG. 19, an annular protrusion 16*d* that cooperates with the boss part 14 to hold the attachment annular member 44 therebetween may be provided on the disk part 16 of the hub 11 of the damper pulley 10. In that case, the attachment annular member 44 can be firmly fixed between the step surface 14*c* of the boss part 14 and an inner surface of the protrusion 16*d*. The protrusion 16*d* may also be provided on the disk part 16 of the hub 11 when the attachment annular member 43 described above is used.

Although FIG. 19 shows the attachment annular member 44 according to the second variation attached to the sealing structure 5 with a torsional damper and an oil seal, the attachment annular member 44 according to the second variation can also be used with the sealing structure 6 with a torsional damper and an oil seal, as with the attachment annular member 42. In this case also, the boss part 14 of the damper pulley 10 preferably has the step surface 14*c* that is the outer circumferential surface connected to the outer circumferential surface 14*b* on the outer side of the outer circumferential surface 14*b*. Any sealing structure with the attachment annular member 44 according to this variation can achieve the same effects as the sealing structures 5 and 6 with a torsional damper and an oil seal according to the fifth and sixth embodiments of the present disclosure described above.

Next, a sealing structure with a torsional damper and an oil seal according to a seventh embodiment of the present disclosure will be described. A sealing structure 7 with a torsional damper and an oil seal according to the seventh embodiment of the present disclosure differs from the sealing structure 1 with a torsional damper and an oil seal according to the first embodiment of the present disclosure described above in the structure forming the hub pocket 30. In the following, only the difference will be described, and the components of the sealing structure 7 with a torsional damper and an oil seal according to the seventh embodiment of the present disclosure that are the same as or similar to those of the sealing structure 1 according to the first embodiment of the present disclosure described above will be denoted by the same reference numerals and will not be further described.

Figure 20:
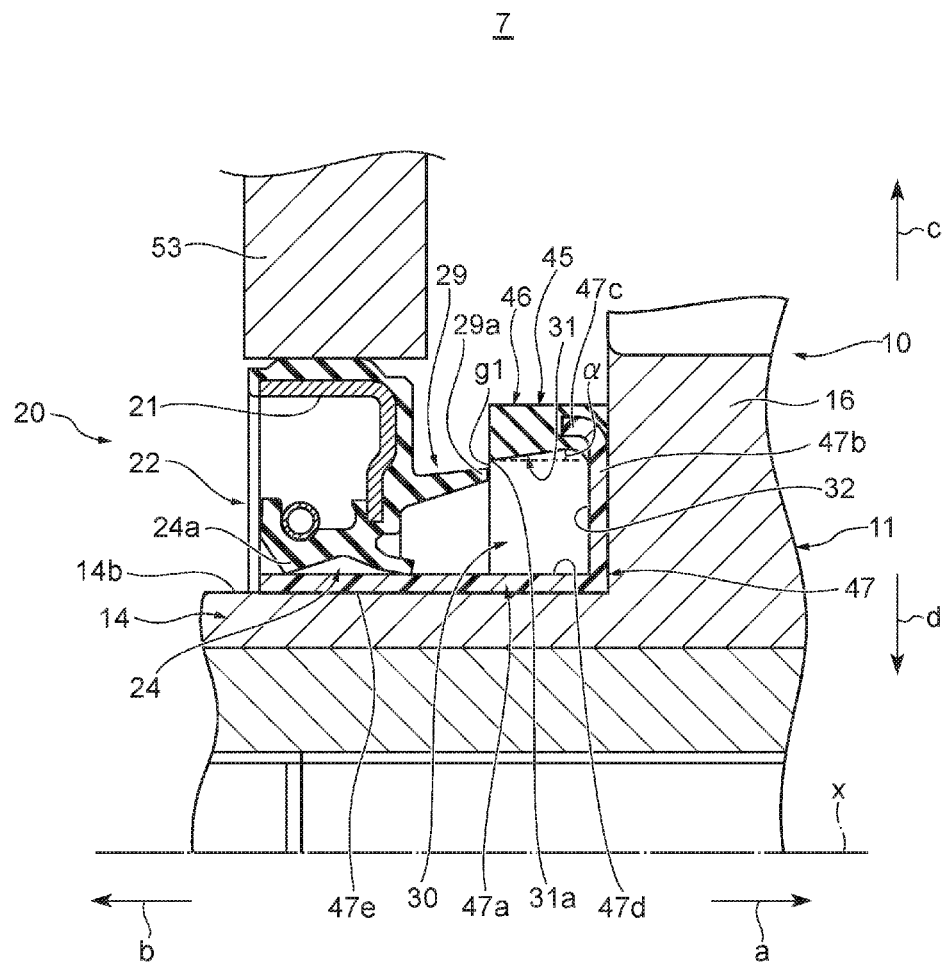
FIG. 20 is a partial enlarged cross-sectional view taken along an axis, showing a schematic configuration of a sealing structure with a torsional damper and an oil seal according to a seventh embodiment of the present disclosure.

FIG. 20 is a partial enlarged cross-sectional view taken along the axis x, showing a schematic configuration of the sealing structure 7 with a torsional damper and an oil seal according to the seventh embodiment of the present disclosure. As shown in FIG. 20, with the damper pulley 10 of the sealing structure 7 with a torsional damper and an oil seal, as in the sealing structure 5 with a torsional damper and an oil seal according to the fifth embodiment of the present disclosure described above, the hub pocket 30 is not formed in the hub 11 of the damper pulley 10. The sealing structure 7 with a torsional damper and an oil seal has an attachment annular member 45 that is separate from the hub 11 and is attached to the damper pulley 10, and the hub pocket 30 is formed in the attachment annular member 45.

The attachment annular member 45 is a disk-shaped hollow annular member centered about the axis x. The attachment annular member 45 is shaped to be fitted around the boss part 14 of the damper pulley 10, and a recess is formed in one side surface of the attachment annular member 45 to provide the hub pocket 30. More specifically, as shown in FIG. 20, the attachment annular member 45 has an annular elastic flange part 46 centered about the axis x that is made of an elastic material, and an annular metal part 47 centered about the axis x that is made of a metal material.

The annular metal part 47 has a cylindrical part 47*a* that is a cylindrical part centered about the axis x, a disk part 47*b* that is a disk-shaped part that extends toward the outer periphery side in the radial direction from an outer side end of the cylindrical part 47*a*, and an outer circumferential part 47*c* that is a part that is bent and extends toward the inner side from an outer periphery side end of the disk part 47*b*. The annular metal part 47 is made of a metal material as described above, and is formed from a single metal member, such as a metal plate, by press working or the like. The cylindrical part 47*a*, the disk part 47*b* and the outer circumferential part 47*c* are integrally made from the same material, and have the same or substantially the same thickness. The metal material forming the annular metal part 47 is stainless steel or SPCC (cold rolled steel sheet), for example.

The elastic flange part 46 is made of a rubber material, for example. The rubber material forming the elastic flange part 46 may be the same elastic rubber material as the elastic body part 22 of the oil seal 20 described above. As shown in FIG. 20, the elastic flange part 46 is an annular member that extends in the direction of the axis x and is attached on the outer periphery side of the annular metal part 47 to extend toward the inner side from the disk part 47*b* of the annular metal part 47. More specifically, the elastic flange part 46 of the attachment annular member 45 is held by embedding the outer circumferential part 47*c* and an outer periphery side part of the disk part 47*b* of the annular metal part 47 and its periphery in the elastic flange part 46 from the outer side. In addition, an inner periphery side surface of the elastic flange part 46 forms the outer circumferential surface 31 of the hub pocket 30, and the outer circumferential surface 31 is inclined at the inclination angle α with respect to the axis x as described above. The elastic flange part 46 is molded by cross-linking and is bonded to the annular metal part 47 by cross-linking bonding during the cross-linking.

As can be seen from the above description, on the attachment annular member 45, the cylindrical part 47*a* and the disk part 47*b* of the annular metal part 47 and the elastic flange part 46 define a space to provide the hub pocket 30. An inner side surface of the disk part 47*b* of the annular metal part 47 forms the bottom surface 32 of the hub pocket 30, and the outer circumferential surface 47*d*, which is a outer periphery side surface of the cylindrical part 47*a* of the annular metal part 47, forms an inner periphery side surface of the hub pocket 30 that is opposed to the outer circumferential surface 31 of the hub pocket 30.

The cylindrical part 47*a* of the annular metal part 47 is shaped to be fitted around the boss part 14 of the damper pulley 10. In the state in which the attachment annular member 45 is attached to the boss part 14, an inner circumferential surface 47*e*, which is an inner periphery side surface of the cylindrical part 47*a*, is in intimate contact with the outer circumferential surface 14*b* of the boss part 14. The attachment annular member 45 is attached to the hub 11 of the damper pulley 10 with the cylindrical part 47*a* of the annular metal part 47 fitted around the boss part 14 in such a manner that the attachment annular member 45 cannot relatively move with respect to the hub 11 of the damper pulley 10. In this state, the disk part 47*b* of the annular metal part 47 may abut against the disk part 16 of the hub 11 or may be at a predetermined distance from the disk part 16 of the hub 11.

As shown in FIG. 20, the cylindrical part 47*a* of the annular metal part 47 extends to the lip tip end part 24*a* of the oil seal 20 or beyond the lip tip end part 24a toward the inner side, and the outer circumferential surface 47d of the cylindrical part 47a is in slidable contact with the lip tip end part 24a. In this embodiment, unlike embodiments described above, the outer circumferential surface 47d of the cylindrical part 47a of the annular metal part 47 of the attachment annular member 45 serves as the lip sliding surface for the oil seal 20, instead of the outer circumferential surface 14b of the boss part 14. To this end, as in the case of the attachment annular member 42 (see FIG. 16) described above, the outer circumferential surface 47d of the cylindrical part 47a is formed by a treatment such as polishing or coating. In this embodiment, as with the sealing structure 5 according to the fifth embodiment of the present disclosure described above, a treatment (machining or the like) to make the outer circumferential surface 14b of the boss part 14 suitable for the lip sliding surface can be omitted. The outer circumferential part 47c of the annular metal part 47 has at least a length that allows the annular metal part 47 to hold the elastic flange part 46.

In the state in which the attachment annular member 45 is attached to the damper pulley 10, the annular gap g1 is formed between the outer end 29a of the side lip 29 of the oil seal 20 and the inner end 31a of the outer circumferential surface 31 of the hub pocket 30, as with the sealing structure 1 with a torsional damper and an oil seal described above.

The sealing structure 7 with a torsional damper and an oil seal according to the seventh embodiment of the present disclosure described above can achieve the same effects and advantages as the sealing structure 1 with a torsional damper and an oil seal according to the first embodiment of the present disclosure, and can reduce exposure of the seal lip 24 of the oil seal 20 to foreign matter entering from around the damper pulley 10.

With the sealing structure 7 with a torsional damper and an oil seal according to the seventh embodiment of the present disclosure, in the attachment annular member 45 in which the hub pocket 30 is formed, the outer circumferential surface 31 of the hub pocket 30 is provided by the elastic flange part 46 made of an elastic material. Therefore, the outer circumferential surface 31 can be precisely shaped to set the diameter-increasing angle α of the outer circumferential surface 31 of the hub pocket 30 at a desired value. This is because molding of a rubber material is superior to press-working of a metal material in dimensional precision of the molding. Even if the side lip 29 comes into contact with the elastic flange part 46 because of misalignment of the boss part 14 of the damper pulley 10 or the like, the elastic flange part 46, which is made of an elastic material such as a rubber material, absorbs the shock and is less likely to damage the side lip 29. In addition, in the press-working of a metal member having a complicated shape, a residual stress occurs in the metal member, and the entire metal member is susceptible to distortion. However, with the attachment annular member 45, the annular metal part 47, which is made of a metal material, has a simple shape, so that the molding precision (dimensional precision) of the annular metal part 47 is improved.

With the sealing structure 7 with a torsional damper and an oil seal according to the seventh embodiment of the present disclosure, since the hub pocket 30 is formed in the attachment annular member 45, the hub pocket 30 can be easily machined, as with the sealing structure 3 with a torsional damper and an oil seal according to the third embodiment of the present disclosure described above.

In the sealing structure 7 with a torsional damper and an oil seal described above, the side lip 29 of the oil seal 20 does not enter the hub pocket 30. However, a part of the side lip 29 on the side of the outer end 29a thereof may lie inside the hub pocket 30, and the side lip 29 and the outer circumferential surface 31 of the hub pocket 30 may overlap with each other over the direction of the axis x in the radial direction. That is, as with the sealing structures 2 and 6 (FIGS. 11 and 17) described above, the side lip 29 and the outer circumferential surface 31 of the hub pocket 30 may be opposed to each other in the radial direction, and the annular gap g2 may be formed between the side lip 29 and the outer circumferential surface 31 of the hub pocket 30.

In the sealing structure 7 with a torsional damper and an oil seal described above, the shape of the annular metal part 47 of the attachment annular member 45 is not limited to the shape described above. For example, as with the attachment annular member 43 shown in FIG. 18 described above, the cylindrical part 47a may not extend to the seal lip 24a, and the boss part 14 of the damper pulley 10 may provide the lip sliding surface. In that case also, as shown in FIG. 18, it is preferred that the boss part 14 of the damper pulley 10 has the step surface 14c that is an outer circumferential surface connected to the outer circumferential surface 14b on the outer side of the outer circumferential surface 14b, and the attachment annular member 45 is fitted around the step surface 14c.

In addition, the shape of the annular metal part 47 of the attachment annular member 45 may be a shape that has no cylindrical part 47a, as with the attachment annular member 44 shown in FIG. 19 described above. In that case, the shape of the hub 11 of the damper pulley 10 is preferably a shape that has the protrusion 16d and the step surface 14c as shown in FIG. 11 described above.

Next, a sealing structure with a torsional damper and an oil seal according to an eighth embodiment of the present disclosure will be described. A sealing structure 8 with a torsional damper and an oil seal according to the eighth embodiment of the present disclosure differs from the sealing structure 1 with a torsional damper and an oil seal according to the first embodiment of the present disclosure described above in the structure of the annular gap g1. In the following, only the difference will be described, and the components of the sealing structure 8 with a torsional damper and an oil seal according to the eighth embodiment of the present disclosure that are the same as or similar to those of the sealing structure 1 according to the first embodiment of the present disclosure described above will be denoted by the same reference numerals and will not be further described.

Figure 21:
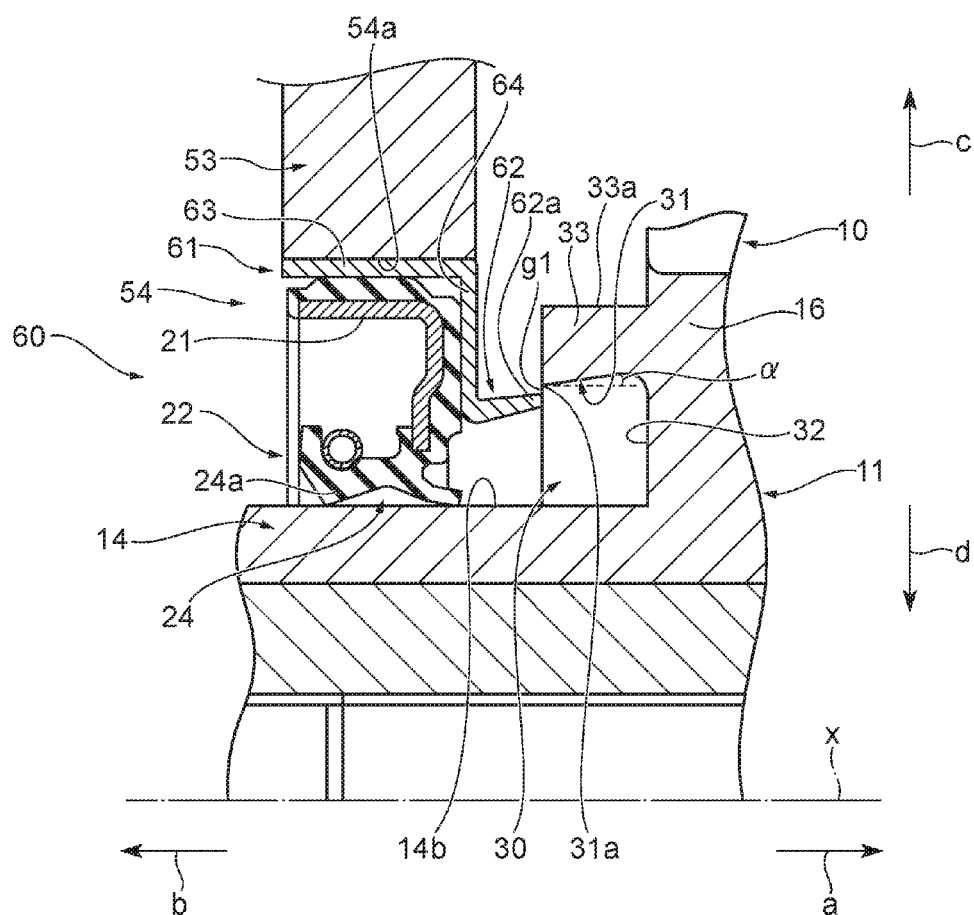
FIG. 21 is a partial enlarged cross-sectional view taken along an axis, showing a schematic configuration of a sealing structure with a torsional damper and an oil seal according to an eighth embodiment of the present disclosure.
Figure 22:
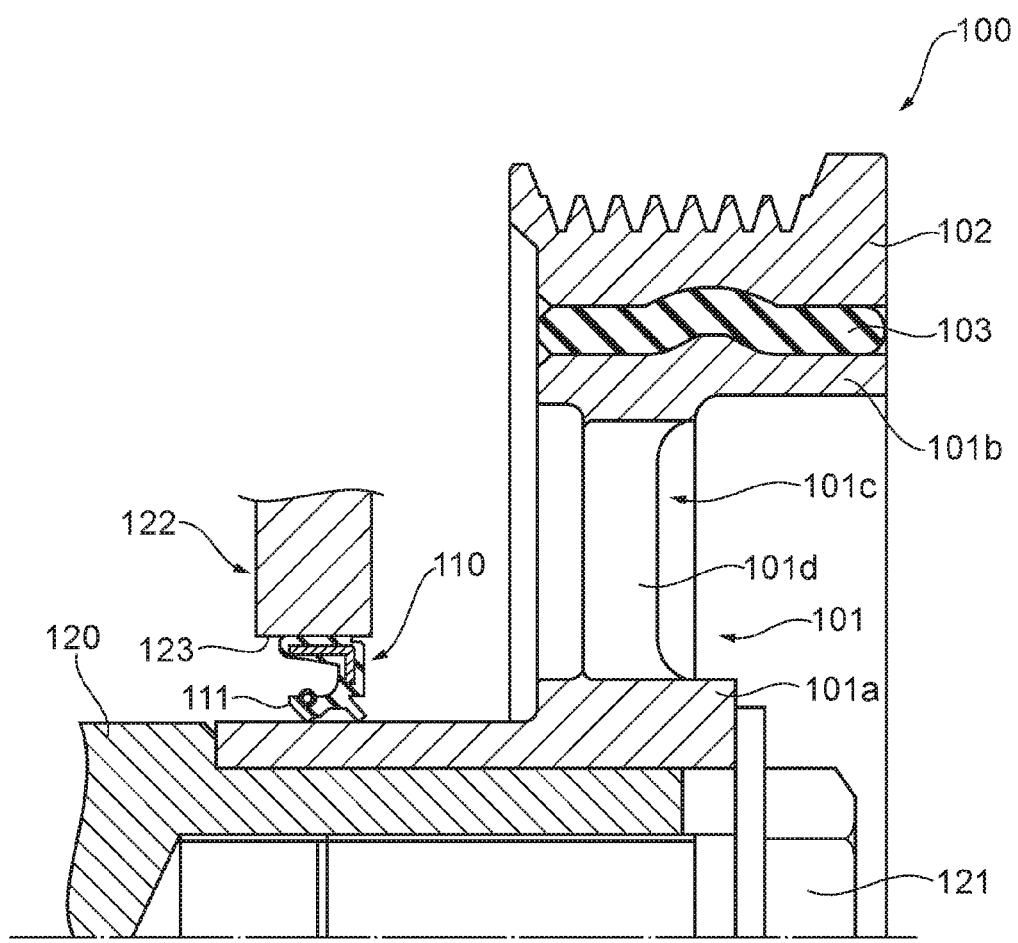
FIG. 22 is a partial cross-sectional view taken along an axis, schematically showing a conventional arrangement of a damper pulley and an oil seal used in an engine of a vehicle.

FIG. 21 is a partial enlarged cross-sectional view taken along the axis x, showing a schematic configuration of the sealing structure 8 with a torsional damper and an oil seal according to the eighth embodiment of the present disclosure. As shown in FIG. 21, the sealing structure 8 with a torsional damper and an oil seal includes an oil seal 60 instead of the oil seal 20 of the sealing structure 1 described above, and further includes an annular member 61 that forms the gap g1. The oil seal 60 differs from the oil seal 20 in that the oil seal 60 does not have the side lip 29 and is not directly fitted into the through-hole 54 of the front cover 53.

The annular member 61 is a hollow annular member centered about the axis x. The annular member 61 has a protrusion 62 that serves as a side lip that provides an outer circumferential surface inclined at the same inclination angle γ (see FIG. 6) as the outer circumferential surface of the side lip 29 of the oil seal 20 described above, and can be fitted into the through-hole 54 of the front cover 53. More specifically, the annular member 61 has a cylindrical fitting part 63 centered about the axis x, and a disk-shaped supporting part 64 that extends toward the inner periphery side from an outer side end of the fitting part 63. The protrusion 62 extends from an inner periphery side end of the supporting part 64 in the opposite direction to the fitting part 63 toward the hub pocket 30.

The fitting part 63 is shaped so that the fitting part 63 can be fitted into the through-hole 54 of the front cover 53 and the outer periphery side circumferential surface thereof is in intimate contact with the inner circumferential surface 54*a* of the through-hole 54 when the fitting part 63 is fitted into the through-hole 54 of the front cover 53. The protrusion 62 is an annular part centered about the axis x, and the gap g1 is formed between an outer end 62*a*, which is an outer side end of the protrusion 62, and the inner end 31*a* of the outer circumferential surface 31 of the hub pocket 30.

The annular member 61 is made of a metal material or a resin material, and the metal material is stainless steel or SPCC (cold rolled steel sheet), for example. When the sealing structure 8 is used in an environment in which rust is likely to occur, the metal material forming the annular member 61 is preferably stainless steel. The annular member 61 is formed separately from the oil seal 60 by press-working or resin molding. As shown in FIG. 21, the annular member 61 is fitted into the front cover 53 by fitting the oil seal 60 into the annular member 61 and then pressing the supporting part 64 of the annular member 61 to fit the fitting part 63 into the through-hole 54 of the front cover 53. In this way, the oil seal 60 and the annular member 61 is fitted to the front cover 53, and the gap g1 is formed.

The protrusion 62 of the annular member 61 is not limited to the configuration in which the protrusion 62 does not enter the hub pocket 30. As with the side lip 29 of the sealing structure 2 described above, a part of the protrusion 62 on the side of the outer end 62*a* thereof may lie inside the hub pocket 30, the protrusion 62 and the outer circumferential surface 31 of the hub pocket 30 may overlap with each other over the direction of the axis x in the radial direction. That is, as with the sealing structure 2 (FIG. 11) described above, the protrusion 62 and the outer circumferential surface 31 of the hub pocket 30 may be opposed to each other in the radial direction, and the annular gap g2 may be formed between the protrusion 62 and the outer circumferential surface 31 of the hub pocket 30.

The sealing structure 8 with a torsional damper and an oil seal according to the eighth embodiment of the present disclosure can achieve the same effects as the sealing structures 1 and 2 with a torsional damper and an oil seal according to the first and second embodiments of the present disclosure described above. In addition, the annular member 61 is made of a metal material or a resin material and has a higher rigidity than a member made of a rubber material, so that the protrusion 62 is less likely to be deformed under its own weight. Therefore, when the gap g2 is formed between the protrusion 62 and the hub pocket 30, the protrusion 62 can be elongated without deflection under its own weight. Thus, the overlap amount b between the protrusion 62 and the hub pocket 30 can be increased, and the amount of foreign matter entering through the gap g2 can be reduced.

The oil seal 60 and the annular member 61 according to this embodiment can replace the oil seal 20 of the sealing structures 3 to 7 with a torsional damper and an oil seal according to the third to seventh embodiments of the present disclosure described above.

Although embodiments of the present disclosure have been described above, the present disclosure is not limited to the embodiments described above and includes any aspects without departing from the spirit of the present disclosure and the scope of the claims. Furthermore, the configurations can be selectively combined as required in order to solve at least a part of the problems described above or achieve at least a part of the effects described above. For example, the shape, the material, the location, the size or the like of each component in embodiments described above can be changed as required depending on the specific application of the present disclosure.

Specifically, the damper pulley 10, the oil seal 20 or 60, or the annular member 61 can have any other shape, as far as it has the hub pocket 30 and the side lip 29 or protrusion 62 that form the gap g1 or g2 described above.

Although the sealing structures 1 to 8 with a torsional damper and an oil seal according to the embodiments have been described as being used for an engine of an automobile, the application of the sealing structure with a torsional damper and an oil seal according to the present disclosure is not limited thereto, and the present disclosure can be applied to any structure, such as a rotary shaft of another vehicle, a general-purpose machine, or an industrial machine, that can take advantage of the effects achieved by the present disclosure. Furthermore, the torsional damper (damper pulley 10) according to these embodiments has been described as having the windows 16*a* that are through-holes penetrating the disk part 16 between the inner side and the outer side thereof, the application of the sealing structure with a torsional damper and an oil seal according to the present disclosure is not limited thereto, and the present disclosure can be applied to a torsional damper having no windows 16*a*.

What is claimed is:

1. A sealing structure with a torsional damper and an oil seal,
    wherein the torsional damper includes a hub, an annular mass body centered about an axis that covers an outer circumference of the hub, and a damper elastic body that is disposed between the hub and the mass body and elastically connects the hub and the mass body to each other, the torsional damper being attached to one end of a rotary shaft with the hub being inserted into a through-hole of an attachment target part,
    the oil seal includes an annular seal lip centered about the axis and an annular side lip centered about the axis and is attached in the through-hole of the attachment target part to seal between the hub and the through-hole of the attachment target part,
    the hub includes an annular boss part centered about the axis, an annular rim part centered about the axis that is located at an outer periphery of the boss part, a disk-shaped disk part centered about the axis that connects the boss part and the rim part to each other, and an annular hub pocket centered about the axis,
    the hub pocket includes an annular outer circumferential surface opposed to the boss part on an outer periphery side and provides an annular recess centered about the axis that is recessed in a direction toward the disk part,
    the outer circumferential surface of the hub pocket increases in diameter toward the disk part along the axis, and
    the seal lip of the oil seal directly or indirectly abuts against the boss part in a slidable manner, and the side lip of the oil seal extends toward the hub pocket so that an annular gap is formed between the side lip and the outer circumferential surface of the hub pocket.

2. The sealing structure with a torsional damper and an oil seal according to claim 1, wherein the side lip forms the annular gap with an end portion of the outer circumferential surface of the hub pocket on the side of the oil seal.

3. The sealing structure with a torsional damper and an oil seal according to claim 1, wherein the side lip is opposed to the outer circumferential surface of the hub pocket, and the annular gap is formed between the side lip and the outer circumferential surface of the hub pocket.

4. The sealing structure with a torsional damper and an oil seal according to claim 1, wherein a diameter-increasing angle, which is an angle of the diameter-increasing outer circumferential surface of the hub pocket with respect to the axis, is equal to or greater than 4° and equal to or smaller than 18°.

5. The sealing structure with a torsional damper and an oil seal according to claim 1, wherein a gap angle difference, which is the difference between a diameter-increasing angle, which is an angle of the diameter-increasing outer circumferential surface of the hub pocket with respect to the axis, and an inclination angle, which is an angle of the side lip with respect to the axis, is equal to or greater than 1.0° and equal to or smaller than 11.0°.

6. The sealing structure with a torsional damper and an oil seal according to claim 1, wherein the hub has an annular attachment annular member that is removably attached to the boss part of the hub, and the outer circumferential surface of the hub pocket is formed in the attachment annular member.

7. The sealing structure with a torsional damper and an oil seal according to claim 1, wherein the disk part of the hub of the torsional damper has at least one window that penetrates the disk part.

8. A sealing structure with a torsional damper and an oil seal, comprising:
a hollow and annular annular member centered about an axis,
wherein the torsional damper includes a hub, an annular mass body centered about the axis that covers an outer circumference of the hub, and a damper elastic body that is disposed between the hub and the mass body and elastically connects the hub and the mass body to each other, the torsional damper being attached to one end of a rotary shaft with the hub being inserted in a through-hole of an attachment target part,
the annular member is formed to be capable of being fitted into the through-hole of the attachment target part and has an annular protrusion centered about the axis,
the oil seal includes an annular seal lip centered about the axis and is attached in the through-hole of the attachment target part via the annular member to seal between the hub and the through-hole of the attachment target part,
the hub includes an annular boss part centered about the axis, an annular rim part centered about the axis that is located at an outer periphery of the boss part, a disk-shaped disk part centered about the axis that connects the boss part and the rim part to each other, and an annular hub pocket centered about the axis,
the hub pocket includes an annular outer circumferential surface opposed to the boss part on an outer periphery side and provides an annular recess centered about the axis that is recessed in a direction toward the disk part,
the outer circumferential surface of the hub pocket increases in a diameter toward the disk part along the axis,
the seal lip of the oil seal directly or indirectly abuts against the boss part in a slidable manner, and
the protrusion of the annular member extends toward the hub pocket so that an annular gap is formed between the protrusion and the outer circumferential surface of the hub pocket.

9. The sealing structure with a torsional damper and an oil seal according to claim 8, wherein the disk part of the hub of the torsional damper has at least one window that penetrates the disk part.

* * * * *